United States Patent
Galbraith et al.

(10) Patent No.: US 10,904,200 B2
(45) Date of Patent: Jan. 26, 2021

(54) SYSTEMS, APPARATUS, AND METHODS FOR PLATFORM-AGNOSTIC MESSAGE PROCESSING

(71) Applicant: Talla, Inc., Brookline, MA (US)

(72) Inventors: Byron Galbraith, Quincy, MA (US); Jon Klein, Medford, MA (US)

(73) Assignee: Talla, Inc., Brookline, MA (US)

( * ) Notice: Subject to any disclaimer, the term of this patent is extended or adjusted under 35 U.S.C. 154(b) by 0 days.

(21) Appl. No.: 16/380,556

(22) Filed: Apr. 10, 2019

(65) Prior Publication Data

US 2019/0306107 A1 Oct. 3, 2019

Related U.S. Application Data

(63) Continuation of application No. PCT/US2017/056220, filed on Oct. 11, 2017.
(Continued)

(51) Int. Cl.
*H04L 29/02* (2006.01)
*H04L 12/58* (2006.01)
(Continued)

(52) U.S. Cl.
CPC .......... *H04L 51/36* (2013.01); *G06F 9/547* (2013.01); *G06F 40/30* (2020.01); *G06N 20/00* (2019.01);
(Continued)

(58) Field of Classification Search
CPC ................ H04L 51/36; G06N 20/00
See application file for complete search history.

(56) References Cited

U.S. PATENT DOCUMENTS 8,463,726 B2  6/2013  Jerram et al.
8,751,428 B2  6/2014  Jerram et al.
(Continued)

FOREIGN PATENT DOCUMENTS

EP         2 650 776 A1   10/2013
WO   WO 2013/192443 A1   12/2013
(Continued)

OTHER PUBLICATIONS

International Search Report and Written Opinion dated Jan. 5, 2019 for International Application No. PCT/US2017/056220, 11 pages.
(Continued)

*Primary Examiner* — Adnan M Mirza
(74) *Attorney, Agent, or Firm* — Cooley LLP

(57) ABSTRACT

Systems, apparatus, and methods are disclosed for intelligent communication over multiple communications platforms. A dispatch controller interfaces with at least one communication platform to obtain and convert messages to a platform-agnostic format annotated with user and source information. A processing and routing controller applies natural language processing and machine learning techniques to interpret user requests and simultaneously become better at interpreting user requests. A task performance controller invokes specific tasks extracted from routed messages and/or initiates responses to user requests. At least one message bus communicates between the dispatch controller, the processing controller, and the task performance controller, and at least one memory device stores data and processor-executable instructions employed by the dispatch controller, the processing controller, and the task performance controller.

28 Claims, 11 Drawing Sheets

Related U.S. Application Data

(60) Provisional application No. 62/406,846, filed on Oct. 11, 2016.

(51) Int. Cl.
    *G06N 20/00*     (2019.01)
    *G06F 9/54*     (2006.01)
    *G06Q 30/02*     (2012.01)
    *G06Q 10/10*     (2012.01)
    *G06F 40/30*     (2020.01)

(52) U.S. Cl.
    CPC ....... *G06Q 10/107* (2013.01); *G06Q 30/0282* (2013.01); *H04L 51/02* (2013.01)

(56) References Cited

U.S. PATENT DOCUMENTS

| | | |
|---|---|---|
| 8,977,584 B2 | 3/2015 | Jerram et al. |
| 9,043,407 B1 | 5/2015 | Gaulke et al. |
| 9,450,901 B1 | 9/2016 | Smullen et al. |
| 9,641,470 B2 | 5/2017 | Smullen et al. |
| 9,647,968 B2 | 5/2017 | Smullen et al. |
| 9,690,830 B2 | 6/2017 | Decker et al. |
| 2005/0018996 A1 | 6/2005 | Lee et al. |
| 2008/0109875 A1 | 5/2008 | Kraft |
| 2011/0078105 A1 | 3/2011 | Wallace |
| 2011/0213642 A1* | 9/2011 | Makar ............ G06F 40/30 705/7.38 |
| 2013/0290234 A1 | 10/2013 | Harris et al. |
| 2014/0052794 A1 | 2/2014 | Tucker et al. |
| 2014/0380285 A1 | 12/2014 | Gabel et al. |
| 2016/0055236 A1 | 2/2016 | Frank et al. |
| 2016/0080485 A1 | 3/2016 | Hamedi |
| 2016/0193732 A1 | 7/2016 | Breazeal et al. |
| 2016/0294952 A1 | 10/2016 | Bodell et al. |
| 2017/0180284 A1 | 6/2017 | Smullen et al. |
| 2017/0228520 A1 | 8/2017 | Kidd et al. |
| 2017/0237692 A1 | 8/2017 | Sheth et al. |

FOREIGN PATENT DOCUMENTS

| | | |
|---|---|---|
| WO | WO 2016/154603 A1 | 9/2016 |
| WO | WO 2018/081833 A1 | 5/2018 |

OTHER PUBLICATIONS

International Search Report and Written Opinion dated Mar. 1, 2018 for International Application No. PCT/US2017/059408, 20 pages.

* cited by examiner

SYSTEMS, APPARATUS, AND METHODS FOR PLATFORM-AGNOSTIC MESSAGE PROCESSING

CROSS-REFERENCE TO RELATED APPLICATIONS

This application is a continuation of International Patent Application No. PCT/US2017/056220, entitled "Systems, Apparatus, and Methods for Platform-Agnostic Message Processing," filed on Oct. 11, 2017, which claims the priority benefit, under 35 U.S.C. § 119(e), of U.S. Application, 62/406,846, entitled "Systems, Apparatus, and Method for Platform-Agnostic Message Processing," filed on Oct. 11, 2016, the disclosures of which are incorporated herein by reference in their entireties.

REFERENCE TO COMPUTER PROGRAM LISTING

This application includes a computer program listing, which is found in the Computer Program Listing Appendix filed electronically with the U.S. Patent and Trademark Office on Nov. 5, 2020. The Computer Program Listing Appendix was created on Nov. 3, 2020 and the file size is 35.853 kilobytes. The Computer Program Listing Appendix is contained in the Supplemental Content file record on PAIR for U.S. patent application Ser. No. 16/380,556 under file name 16380556_ComputerProgramListingAppendix.txt, which is hereby incorporated by reference in its entirety.

TECHNICAL FIELD

The present disclosure relates generally to systems, apparatus, and methods for intelligent communication over multiple platforms. More specifically, the present disclosure relates to systems, apparatus, and methods for responding to user requests over multiple communication platforms.

BACKGROUND

A chatbot or chatterbot is a computer program designed to simulate human conversation and assist users via dialog systems for customer service, information acquisition, or other applications. Some chatbots are used by organizations to help members communicate and automate several hundreds of tasks every day. While some chatbots are designed with natural language processing systems, most chatbots rely on special commands to accomplish very specific tasks. Chatbots typically are designed for a particular hardware/software platform, such as a particular device, network, website, mobile application, short message service (SMS), instant messaging service, email service, etc.

SUMMARY

Systems, apparatus, and methods are disclosed for intelligent communication over multiple communications platforms. In various implementations, such systems, apparatus and methods use natural language processing and machine learning techniques to interpret user requests and improve the interpretation of such user requests over time.

In some inventive aspects a method of responding to a first message from a user in an organization includes instantiating at least one bot to perform a function. In some cases, the function is specific to the organization and includes at least one of HR support, IT support, learning training and development, sales support, customer success support, market research support, general administrative support, facilities and operations support, credentialing and compliance management support, expert routing directory services, and general knowledge management and delivery. The at least one bot can provide an interface to obtain the first message via a first communications channel within a first provider of a plurality of providers. The function can aid to user experience in obtaining a response. The method also includes obtaining from the user the first message in natural language format at the at least one bot via the first communications channel. The method also includes transforming the first message to a second message format at the first provider. The second message format can be in a schema associated with the first provider and can include data and metadata. At least a portion of the metadata can include identification information associated with the first message. The method also include pushing the second message format to a first controller. The first controller can include a first plurality of modules. Each module in the first plurality of modules can be associated with a corresponding provider in the plurality of providers.

At the first controller, the method includes, extracting the identification information from the second message format via a first module corresponding to the first provider in the first plurality of modules. The method also includes associating the identification information with a plurality of identifiers and transforming the second message format to a third message format. The third message format can be in a standard serialized format. The method also includes determining a second provider in the plurality of providers to transmit the response to the user based on the third message format. The method also includes transmitting the third message format to a second controller. The second controller can include at least one processor, at least one router, and at least one machine learning model.

At the second controller, the method includes transforming the third message format to a fourth message format via the at least one processor. Transforming to the fourth message format can include at least one of: mutating the third message format to at least one of remove and transform a specific identifier from the plurality of identifiers within the third message format, and adding contextual information to the third message format. The method includes transmitting the fourth message format to the at least one router. The method also includes matching the fourth message format against at least one of a plurality of domains and a plurality of tasks via the at least one router. Each domain in the plurality of domains can include a collection of skills and each task in the plurality of tasks can include a specific action. The method also includes determining user intent via the at least one router in the first message based on the matching. The method also includes returning a fifth message format via the at least one router based on the user intent. The fifth message format can include a probability score indicating a likelihood that the user intent is accurate. The method also include implementing a decision policy to determine at least one of a domain from the plurality of domains and a task from the plurality of tasks based on the probability score. The method also include routing the fifth message format to a second module in a second plurality of modules included in a third controller based on the at least one of the domain and the task determined. Each module in the second plurality of modules can be configured to implement at least one of a skill and an action.

At the third controller, the method includes, implementing the second module to return a sixth message format. The sixth message format can include the response to the first message. Implementing the second module can include at least one of calling a third party API and calling an internal API. The internal API can be an access point to at least one functionality within at least one of the first controller and the second controller.

The method also includes transforming the sixth message format to a seventh message format via the first controller. The seventh message format can be in a schema associated with the second provider in the plurality of providers. The method also includes transforming the seventh message format to the response in the natural language format at the second provider. The method also includes transmitting the response in the natural language format to the user through the bot via a second communications channels within the second provider. The at least one processor, the at least one router, the first controller, and the third controller can be configured to access the at least one machine learning model included in the second controller via a web service endpoint.

In some cases, the method further includes establishing a connection between the at least one bot and the provider. In some instances, he at least one bot can include a plurality of bots. In such instances, establishing the connection can include installing a bot application associated with the at least one bot into an environment associated with the first provider. The method can further include assigning a user account to the at least one bot and communicating with a plurality of users via the at least one bot. Establishing the connection can further include obtaining at least one credential related to the first provider via the at least one bot and initiating the connection with the first provider via the at least one bot based on the at least one credential. The at least one credential can include an authentication token granting permission to the at least one bot to access a workspace within the first provider. In some instances, the at least one bot can include a plurality of bots. In such instances, establishing the connection can include setting up an interface to enable communication with the first controller, the second controller, and the third controller. Establishing the connection can further include transmitting from the first provider an initial message to the at least one bot.

In some cases, the method can further include enabling an administrator of the organization via a second interface to at least one of monitor and respond to the first message from the user. In such cases, the third controller can be configured to manage interaction with the administrator via the second interface. Enabling the administrator to monitor and respond to messages can include configuring the second interface to: enable the administrator and the user to create and define workflows, enable the administrator to read incoming requests from the user, and enable the administrator to search a database to identify the response. The second interface can be configured to provide access to the administrator to modify content in the database.

In some cases, the first message can include at least one of a query from the user, a poll response from the user in response to a poll initiated by the at least one bot, and a bot query response from the user in response to a query initiated by the at least one bot. In some cases, associating the identification information can further include accessing a database to associate the identification information with the plurality of identifiers. The plurality of identifiers can include a profile_id indicating a profile of the user, an organization_id indicating the organization, an account_uid indicating the user account as represented by the first provider, a provider_id indicating the first provider, a channel_id indicating the first communications channel, and a bot_id indicating the at least one bot. the database can be configured to store a unique organization_id for each organization in a plurality of organizations and a unique profile_id for each user in a plurality of users within each organization in the plurality of organizations.

In some cases, the standard serialized format is a JSON format. In some cases, the third message format can include—a first portion that includes information indicating the user, the organization, the first provider, the first communications channel, and the at least one bot; a second portion including information indicating the second provider; and a third portion including information indicating a body of the first message. The second portion can further include a plurality of keys that reference values corresponding to profile_id, organization_id, account_uid, provider_id, channel_id, and bot_id in a database. The third portion can further include a plurality of annotations of the first message including the contextual information.

In some cases, the second controller can include a third module and a fourth module. The third module can include the at least one processor and the at least one router. The fourth module can include the at least one machine learning model. The fourth module can expose the at least one machine learning model via the web service endpoint. In some cases, the web service endpoint can be a HTTP endpoint. In some cases, the first controller, the at least one processor, the at least one router, and the third controller access the at least one machine learning model via the fourth module.

In some cases, the at least one router can include a plurality of routers and the fourth message format can be transmitted to each router in the plurality of routers in a plurality of different orders. Each router in the plurality of routers can return the corresponding fifth message format based on the user intent determined by that router. The corresponding fifth message format can include the corresponding probability score. In some cases, implementing the decision policy can include making a comparison of the corresponding probability score from each router in the plurality of routers and determining the at least one of the domain and the task based on the comparison.

In some inventive aspects, a system comprises a first interface to obtain a first message from a user via a first communications channel within a first provider in a plurality of providers, and deliver a response to the first message to the user via a second communications channel within a second provider in the plurality of providers.

The system also includes a first controller communicatively coupled to the first interface. The first controller can include a first plurality of modules. Each module in the first plurality of modules can correspond to each provider in the plurality of providers. The first controller to associate the first message with a plurality of identifiers, transform the first message to a standard serialized format, identify the second communications channel to deliver the response, and transform the response in the standard serialized format to a schema associated with the second provider.

The system also includes a second controller communicatively coupled to the first controller. The second controller can include a dispatcher module and a server module. The dispatcher module can include a plurality of processors and a plurality of routers. The server module can include a plurality of machine learning models. The second controller to determine a user intent in the first message, determine at least one of a domain from a plurality of domains and a task from a plurality of tasks based on the user intent, and router the transformed first message based on at least one of the domain and the task.

The system also includes a third controller communicatively coupled to the first controller and the second controller. The third controller can include a second plurality of modules. Each module in the second plurality of modules can implement a skill based on at least one domain in the plurality of domains or an action based on at least one task in the plurality of tasks. The third controller to implement a module in the second plurality of modules, and return the response in the standard serialized format to the first controller. The first controller, the third controller, the plurality of processors, and the plurality of routers can be configured to access the plurality of machine learning models via at least one web service endpoint.

In some cases, the plurality of machine learning models can include at least one of a maximum entropy classification, a Naive Bayes classification, a k-Nearest Neighbors (k-NN) clustering, a Word2vec analysis, a dependency tree analysis, an n-gram analysis, a hidden Markov analysis, and a probabilistic context-free grammar.

In some inventive aspects, a method of communicating with a user in an organization includes obtaining a message from the user via a user interface. The message also includes transforming the message into a standard serialized format via at least one processor. The message also include processing the message in the standard serialized format via the at least one processor. The message also include determining a user intent via the at least one processor based on the processing. The message also include determining a response via the at least one processor based on the user intent. The message also include transmitting the response to the user via the user interface.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Other systems, processes, and features will become apparent to those skilled in the art upon examination of the following drawings and detailed description. It is intended that all such additional systems, processes, and features be included within this description, be within the scope of the present invention, and be protected by the accompanying claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

The present disclosure describes systems, apparatus, and methods for electronically assisting a user to execute one or more of a variety of tasks and/or obtain various types of information. In some examples, such user assistance is facilitated by processing a request or incoming message from a user (i.e., an "incoming message"), mediating the incoming message through different controllers of hardware and software architecture, and completing a task and/or sending an outgoing message to the user pursuant to the incoming message. Various implementations may be hardware and/or software platform agnostic and span across diverse technologies and services such as chat-clients, SMS, email, audio and/or video files, streaming audio and/or video data, and customized web front-ends.

Figure 1:
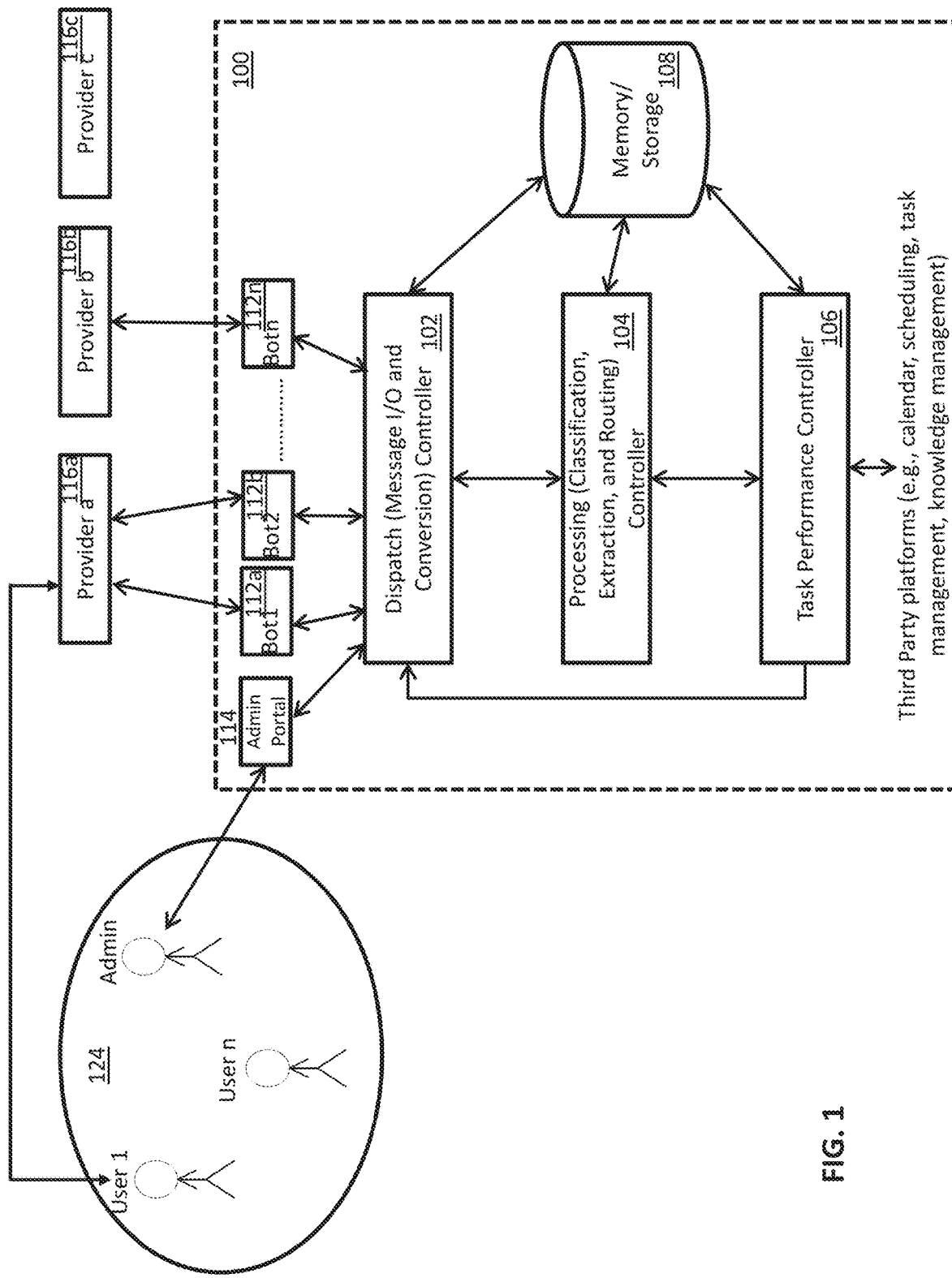
FIG. 1 is a block diagram illustrating an interaction between users and a system in accordance with some inventive aspects.

FIG. 1 is a block diagram illustrating an example interaction between users in an organization 124 and a system 100 for electronically assisting the users in that organization 124 in accordance with various inventive aspects disclosed herein. System 100 includes one or more bots 112a-112n (collectively, bots 112), a dispatch controller 102, a processing and routing controller 104, and a task performance controller 106. In some inventive aspects, system 100 can optionally include an admin portal 114. At least one of dispatch controller 102, processing and routing controller 104, and task performance controller 106 stores and/or accesses processed and/or real-time data in one or more memory devices, such as memory/storage device 108. In various implementations, each of the bots 112, the admin portal 114, the dispatch controller 102, the processing and routing controller 104, and the task performance controller 106 are in digital communication with one another. One or more of the controllers (e.g., dispatch controller 102, processing and routing controller 104, task performance controller 106) similarly are in digital communication with the memory/storage device 108. In some implementations, at least one message bus is used to communicate between the dispatch controller, the processing and routing controller, and the task performance controller.

In some inventive implementations, the bots 112 function as an interface to system 100. One or more users in an organization, such as organization 124, can communicate with system 100 via a plurality of communication methodologies, referred to herein as "communication platforms," or "providers" that interface with the bots. For instance, as shown in FIG. 1, a plurality of providers, for example, 116a-116c (collectively, providers 116) interface with the bots. Examples of such providers include, but are not limited to, a chat-client (e.g., Slack™ Hipchat®, Google Chat™, Microsoft Teams™ etc.), SMS, email, audio and/or video files, streaming audio and/or video data, customized web front-ends, and/or a combination thereof. Each provider can include a "communication channel" that links a bot to that provider. In some inventive aspects, a bot can obtain incoming messages from users in an organization via a communication channel included in a provider. In other words, a user can communicate with system 100 through a provider via a communication channel. System 100 obtains incoming messages and delivers outgoing messages via the bots.

In some inventive implementations of the system 100, the dispatch controller 102 can include a plurality of modules to process incoming messages. Each module in the plurality of modules can be dedicated to a particular provider. Incoming messages can be analyzed and processed by modules that correspond to the providers through which the incoming messages are obtained. For instance, an incoming message through provider A 116a shown in FIG. 1 may be analyzed by a first module within the dispatch controller. An incoming message through provider B 116b shown in FIG. 1 may be analyzed by a second module within the dispatch controller provided that provider A 116a and provider B 116b are different providers/communication platforms. The dispatch controller can convert incoming and outgoing messages between a standard format (e.g., used by the dispatch controller to communicate with other components described further below) and a format of an originating and/or intended communication platform/provider 116.

The processing and routing controller 104 of the system 100 shown in FIG. 1 interprets and routes incoming messages so as to appropriately execute one or more of a variety of skills/actions and/or obtain various types of information pursuant to the incoming messages. The processing and routing controller may include one or more processing components, referred to herein as "message attribute processing controller," to add contextual information to the incoming message for further processing. The processing and routing controller further may include one or more routers, referred to herein as "augmented message router," to determine the user intent underlying an incoming message and to route the message accordingly. In various aspects, the processing and routing controller executes machine learning techniques such as maximum entropy classification, Naive Bayes classification, a k-Nearest Neighbors (k-NN) clustering, Word2vec analysis, dependency tree analysis, n-gram analysis, hidden Markov analysis, probabilistic context-free grammar, and/or a combination thereof. The processing and routing controller further may include one or more compilers and/or high-level language interpreters, and may implement natural language processing techniques, data science models, and/or other learning techniques.

The task performance controller 106 of the system 100 shown in FIG. 1 generally implements action components, such as a set of core-skills/actions that may or may not be implemented in real-time. The core skills/actions may be implemented by the task performance controller via a web application development framework. The web application framework may be written in Ruby (i.e., a dynamic, reflective, object-oriented, general-purpose programming language).

In some implementations of the system 100 shown in FIG. 1, at least one memory or electronic storage device 108 is used to store real-time data (e.g., at least some of which may be organized in one or more databases) and/or processor-executable instructions to be accessed as necessary. Such a storage device may be in the form of a server (e.g., a cloud server such as Amazon Web Services™) to host data and/or processor-executable instructions used by the other controllers of the system 100.

In some implementations, an administrator of the organization 124 can interact with the system 100 via the admin portal 114.

As readily appreciated by those of skill in the art, the dispatch controller 102, the processing and routing controller 104, and the task controller 106 can each be implemented as computer-executable code stored in computer-readable, non-volatile memory and executed by a processor. They can be collocated or distributed as desired using suitable hardware and connections. Similarly, bots 112 and admin portal 114 can be implemented as any suitable type of computer-readable, software application and can be bundled with a computer or published separately. They can be built for a particular type of computer (e.g., desktop computers, smartphones, smartbooks, laptops, tablet computer, etc.) and can be installed on the computer.

High-Level Overview

Figure 2:
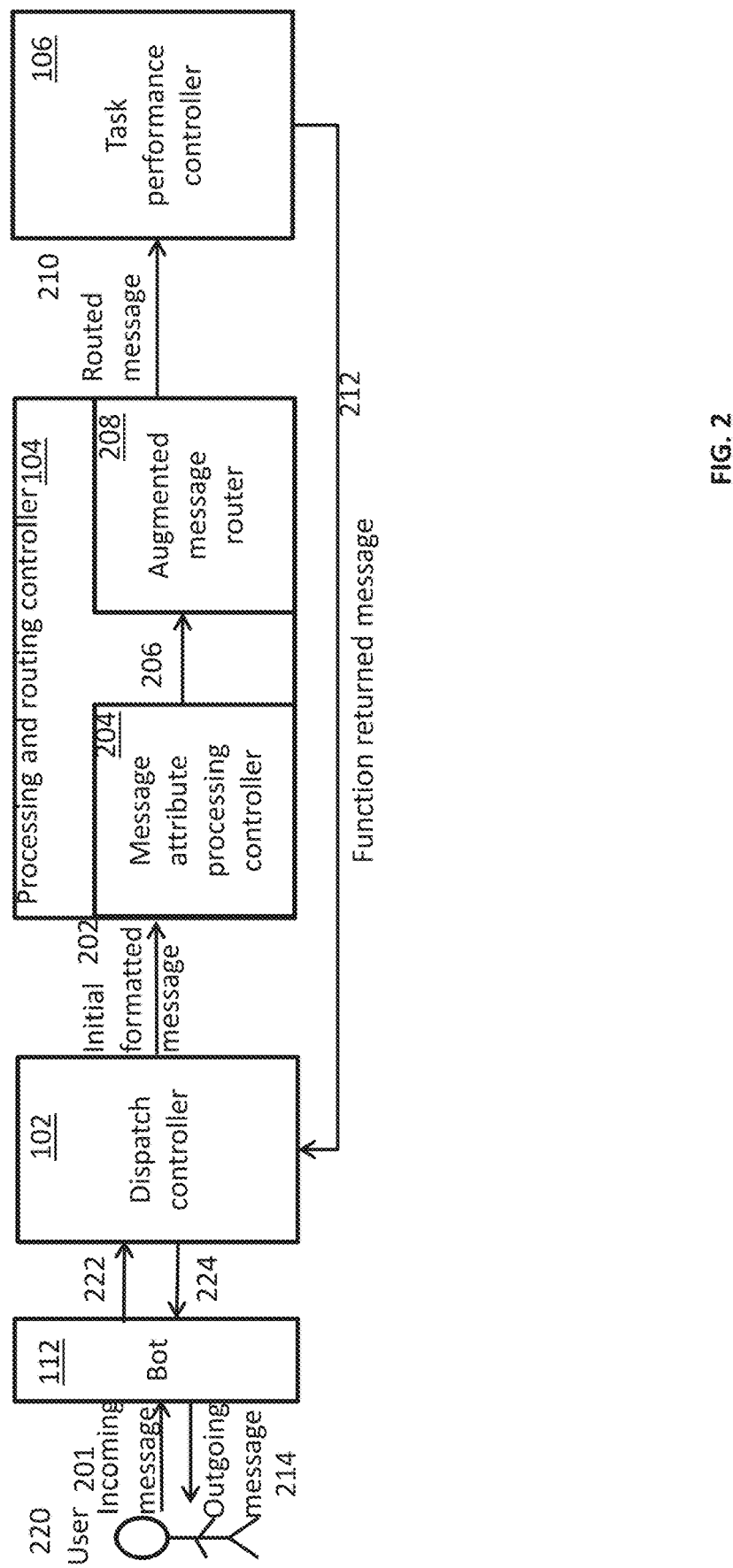
FIG. 2 is a flow diagram illustrating a high-level overview of processing an incoming message in accordance with some inventive aspects.

FIG. 2 illustrates a flow diagram depicting the high-level overview of processing an incoming message 201 from a user 220. According to some inventive aspects, system 100 may obtain an incoming message 201 from a user 220 to complete a task. Bot 112 may obtain incoming message 201 through a provider (not shown) in natural language format. The provider may transform incoming message 201 that is in natural language format to a schema that is associated with the provider. That is, each provider may have a schema of its own. The provider may transform incoming message 201 to incoming schema message 222. Incoming schema message 222 is pushed from bot 112 to dispatch controller 102. Thus, incoming schema message 222 may be in a schema that is associated with the provider through which bot 112 has obtained the message.

Dispatch controller 102 may perform initial processing. Dispatch controller 102 may include one or more modules for processing incoming schema message 222. Each module in dispatch controller 102 may correspond to a particular communication platform/provider. Incoming schema message 222 may be pushed to the module that corresponds with the communication platform/provider through which the message was obtained. Processing incoming schema message 222 via dispatch controller 102 may include determining the identity of the user 220 and the communication platform/provider from which incoming message 201 is obtained. Dispatch controller 102 may resolve the identity of user 220 by matching user 220 to an internal profile within system 100. Internal profiles may be created by storing user identities of all users that may have previously interacted with system 100. Dispatch controller 102 may further associate incoming schema message 222 with a user identifier. Additionally, dispatch controller 102 may determine a platform/provider for communication of incoming message 201, determine the state of incoming message 201, associate a platform identifier based on the communication platform/provider determined, associate a message type identifier indicating the type of the message, provide other initial basic information for routing incoming schema message 222, and/or perform a combination there of. Further, dispatch controller 102 may package incoming schema message 222 into packets of metadata in a standard serialized format (e.g., a JSON string). In this manner, incoming message 201 may be fully normalized so that downstream components need not be concerned about which communication platform/provider was used to transmit incoming message 201, who user 220 is (i.e., user identity), and/or which account(s) are associated with the communication platform and/or user 220. Initial formatted message 202 (e.g., one or more packets of metadata) may then be sent to processing and routing controller 104 via an internal message bus.

Processing and routing controller 104 may be configured to interpret user-intent based on incoming message 201. In some inventive aspects, at least one message attribute processing controller 204 included in processing and routing controller 104 is configured to inspect and modify initial formatted message 202 for use by downstream components by identifying a specific feature associated with initial formatted message 202. Some examples of specific features include an intended recipient of incoming message 201 (e.g., a name assigned to system 100), a date and/or time associated with incoming message 201, a location associated with incoming message 201, and/or any other form of recurring pattern. In some inventive aspects, message attribute processing controller 204 implements one or more pattern matching algorithms (e.g., the Knuth-Morris-Pratt (KMP) string searching algorithm for finding occurrences of a word within a text string, regular expression (RE) pattern matching for identifying occurrences of a pattern of text, Rabin-Karp string searching algorithm for finding a pattern string using hashing, etc.) to identify any specific features. Message attribute processing controller 204 may then modify initial formatted message 202 by removing the identified specific feature (e.g., a string, word, pattern of text, etc.). The modified data may be repackaged into a container (e.g., hash maps, vectors, and dictionary) as a key-value pair. This augmented message 206 is sent from message attribute processing controller 204 to augmented message router 208.

In some inventive aspects, augmented message 206 is processed via at least one augmented message router 208 included in processing and routing controller 104. Each augmented message router 208 may process augmented message 206 upon receipt to match any incoming message 201 to a user-intent. In addition, each augmented message router 208 may also determine the probability of interpreting an incoming message 201 and executing the task associated with incoming message 201. Augmented message router 208 may employ machine learning techniques (e.g., maximum entropy classification, Naive Bayes classification, a k-Nearest Neighbors (k-NN) clustering, Word2vec analysis, dependency tree analysis, n-gram analysis, hidden Markov analysis, probabilistic context-free grammar, etc.) to classify and route augmented message 206. After augmented message 206 is processed and/or extracted by augmented message router 208, information may be saved in one or more memory devices, such as memory device 108. In some inventive aspects, one or more memory devices may provide parameters to enable the implementation of the machine learning techniques. In addition, processing and routing controller 104 may also implement a decision policy to determine which augmented message router 208 should transmit routed message 210 to task performance layer 106.

Following processing and extraction by each augmented message router 208 and implementation of the decision policy by processing and routing controller 104, routed message 210 may be sent from processing and routing controller 104 to task performance layer 106 via an internal bus.

In some inventive aspects, processing and routing controller 104 may include machine learning models, machine learning techniques, natural language processing techniques, data science models, and/or other learning techniques. These techniques can be exposed to other components within system 100 and accessed by other components within system 100 via web service endpoints (e.g., HTTP endpoints). For instance, message attribute processing controller 204 and augmented message router 208 may access machine learning models and techniques via HTTP endpoints to process initial formatted message 202 and augmented message 206 respectively.

In some inventive aspects, routed message 210 is routed to an appropriate component within task performance controller 106. Task performance controller 106 may identify the task and/or domain from the routed message 210 and determine a function/method to be called. Task performance controller 106 may initiate an outgoing message 214 and/or execute the skill/action associated with the incoming message 201 by executing a function/method and by sending function returned message 212 to dispatch controller 102. In some inventive aspects, task performance layer 106 may access one or more learning techniques via web service endpoints to extract information from memory device 108 based at least in part on the identity of user 220 and the account associated with user 220. The extracted information may be used to configure a "personality" for outgoing response 214. Task performance controller 106 may include information associated with the "personality" in function returned message 212.

Dispatch controller 102 may reformat function returned message 212 from the standard serialized format to a schema that is associated with the appropriate provider/platform. Outgoing schema message 224 may be pushed to bot 112. The outgoing communication platform/provider may transform outgoing schema message 224 into natural language format. The reformatted outgoing message 214 may then be sent to user 220 via the chosen provider/communication platform.

Bot

Bot 112 of system 100 shown in FIG. 1 functions as an interface to system 100. Bot 112 is an instance of an entry point into system 100. In some inventive aspects, bot 112 may be a computer program that may conduct a conversation with one or more users via auditory or textual methods. In some inventive aspects, system 100 provides, instantiates, and/or exposes one or more bots as an interface for a specific functionality. For instance, system 100 may instantiate a bot specifically for IT support within an organization. Similarly, system 100 may expose a bot specifically to respond to HR queries in an organization. In other instances, system 100 may instantiate the same bot as an interface for both IT support and to respond to HR queries. That is, in some instances, system 100 may instantiate the same bot as an interface for multiple functionalities. In this manner, the one or more bots can aid to/improve user experience for a user interacting with system 100.

In some inventive aspects, each organization may utilize one or more communication platforms/providers for users within the organization to communicate with system 100. Bot 112 may be provided, instantiated, and/or exposed depending upon the communication platform/provider. For example, in some aspects, a bot application may be installed into a provider environment (e.g., Slack™, Microsoft Teams™). In such aspects, bot 112 manifests depending on the provider. For example, once the bot application is installed the provider may assign a special user account to bot 112. Users can interact with this bot user and/or bot 112 by direct messaging, or sending an invitation to join, or communicating in public chat channels. In this manner, multiple bot users may be added to the same provider (e.g., by installing multiple bot applications). In other words, multiple bots 112 may be installed on the same provider. In other aspects, an interface within a provider environment (e.g., TallaChat™) may be dedicated entirely to system 100. In such aspects, the dedicated interface may function as bot 112 or one of more bots may be enabled or plugged in the provider environment to perform specific functions.

In some inventive aspects, a connection can be established between a provider and bot 112. In one instance, system 100 initiates this connection by obtaining credentials related to the provider. For example, in the case of Slack™, an OAuth 2.0 token may be obtained. This token grants bot 112 various permissions such as the ability to sign into Slack™ workspace and additional backend API tools for requesting user directory and historical data. A language specification such as SAML may be utilized to communicate the authentication information. In another instance, the communication platform/provider initiates the connection by sending a message to system 100. This establishes a communication channel between the provider and bot 112.

A user can send an incoming message to system 100 via bot 112 coupled to a communication channel in a communication platform/provider. Some non-limiting examples of the incoming message include a query, a response to a query previously sent to the user by system 100, and/or the like. For instance, the incoming message may be response to a poll that was previously initiated by bot 112. The incoming message can be in natural language format. The provider may then transform the incoming message into a schema that is associated with the provider. That is, each provider has a schema of its own. When bot 112 obtains the incoming message, the provider through which the incoming message is sent can then transform the incoming message into a schema of the provider. In doing so, the provider may add identification information into the schema. For instance, the provider may add information about the user, the type of message, the communication channel used for communication, and/or the like. That is, the provider can provide source metadata identifying an aspect of origin for the incoming message. The schema can include various other metadata, such as, timestamp data and/or the like. The transformed schema (also referred to as "incoming schema message") is pushed to dispatch controller 102 for further processing.

Dispatch Controller (Incoming Message)

Figure 3:
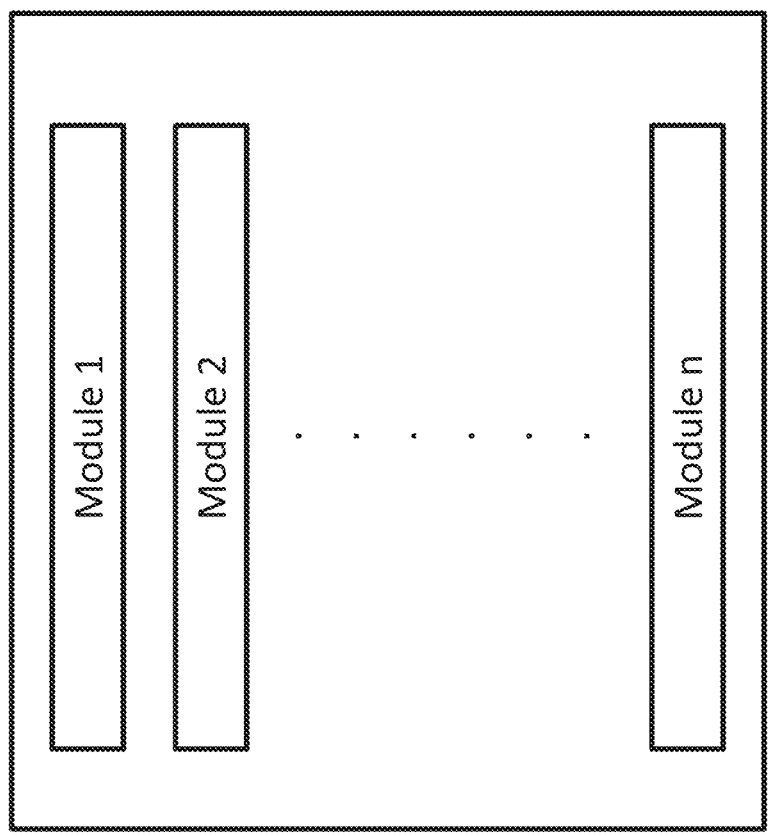
FIG. 3 is a block diagram illustrating a dispatch controller in accordance with some inventive aspects.

Dispatch controller 102 of system 100 shown in FIG. 1 is responsible for obtaining and performing initial processing of incoming schema messages (e.g., user-requests transformed to a provider schema) and for processing at least a part of outgoing communications to users. FIG. 3 illustrates dispatch controller 102 according to some inventive aspects. In some inventive aspects, this controller 102 may include one or more modules (e.g., module 1, module 2, . . . module n). Each module corresponds to a type of provider. For example, dispatch controller 102 can include a dedicated module for Slack™, another dedicated module for Microsoft Teams™, a different module for TallaChat™, and/or the like.

An incoming schema message is pushed to the appropriate module depending on the provider through which the incoming message was obtained. Each module performs initial processing of an incoming schema message by extracting identification information from the incoming schema message. Each module can then associate the incoming schema message with identifiers. That is, dispatch controller 102 may extract the identification information and associate the extracted information with identifiers. Dispatch controller 102 may access a memory, such as memory 108, to associate the incoming schema message with identifiers. For example, the incoming schema message may be modified to indicate or include an identifier representing organization identity (e.g., organization_id), user-identity (e.g., profile_id), source provider (e.g., provider_id), source communications channel (channel_id), source bot (e.g., bot_id) and/or the like.

In some inventive aspects, a unique identifier is assigned for every organization (e.g., organization_id) and is stored in the memory. Each user within an organization may be assigned a unique profile identifier (e.g., profile_id). In other words, if user A in an organization interacts with system 100 through provider A and through provider B, the messages obtained from both these providers are assigned the same internal profile identifier (e.g., profile_id).

In other aspects, the dispatch controller converts the incoming schema message from the format of the source platform to a standard serialized format (e.g., JSON). For instance, the incoming schema message from the provider may have the format of a JavaScript Object Notation (JSON) file or an eXtensible Markup Language (XML) file. Even the format of a JSON/XML file may be different for different providers. That is, for the same incoming message, data in a first JSON/XML file (e.g., a JSON string) from one provider may include different types of data, be organized according to a different syntax, and/or be encoded according to a different encoding scheme compared to data in a second JSON/XML file from another provider. Dispatch controller 102 converts each incoming schema message to a standard serialized format (e.g., a JSON format). In some inventive aspects, the standard format may include annotations indicating the source platform and/or the source format. Thus, in inventive aspects the dispatch controller 102 of the system 100 shown in FIG. 1 normalizes incoming messages from a user such that other components/controllers of the system 100 need not be concerned about platform-specific identities or accounts.

According to some inventive aspects, an example to illustrate the conversion of an incoming message from a source schema associated with a source platform/provider to a standard format is included below. The example illustrates conversion of an incoming message from Slack™ in the form of a JSON file to standard format JSON file. The example additionally illustrates the conversion of the same incoming message from HipChat™ in the form of XML file to a standard format JSON file.

```
Slack ™ (JSON)
{
"type": "message",
"channel": "D0YFWV3LK",
"user": "U0YFWLCSF",
"text": "Hello System, how are you?",
```

```
"ts": "1477657982.000014",
"pinned_to": null,
"team": "T0MQ5H5HC"
}

System standard (JSON)
{
"sender context": {
"profile_id": 1,
"organization_id": 1,
"provider_id": 1,
"account_uid": "U0YFWLCSF",
"channel_id": "D0YFWV3LK",
"bot id": 1,
"type": 0,
"public": false,
"targeted": 0
},
"return route": {
"uri": "slack://127.0.0.1/45579947aa00b46ff59a2f19dc1442fa"
"context": [
123,34,67,104,97,110,110,101,108,73,68,34,58,34,68,48,89,70,87,86,51,76,75,34,44,34,
85,115,101,114,73,68,34,58,34,85,48,89,70,87,76, 67,83,70,34,44,34,84,105,109,101,115,
116,97,109,112,34,58,34,125
]
},
"messages": [{
"body": "Hello system, how are you?",
"interaction": {
Domain": "",
"task": "",
"parameter": null,
"actions": []
}
}],
...
}

HipChat ™ (XML)
<message type='chat' from = '558221_3745966@chat.hipchat.com/web\\proxy|proxy-
c409.hipchat.com\5282' mid = 'c38ae89d-6ee8-4fb7-bbbf-ee5b6a8236a2'
to = '558221_3745526@chat.hipchat.com/bot\\proxy|pubproxy-c400.hipchat.com|5282'
ts = '1477771520.708610'>
<body>Hello System, how are you?</body>
<x xmlns = 'http://hipchat.com/protocol/muc#room'>
<type/>
<notift>1</notift>
<message_format>text</message_format>
</x>
<active xmlns = 'http://jabber.org/protocol/chatstates'/>
</message>

System standard (JSON)
{
"sender context": {
"profile_id": 1,
"organization_id": 1,
"provider_id": 3,
"account_uid": "558221_3745966@chat.hipchat.com/web",
"channel_id" : "558221_3745966@chat.hipchat.com/web",
"bot_id": 1,
"type": 0,
"public": false,
"targeted": 0
},
"return route": {
"uri": "hipchat://127.0.0.1/20f8eacc702bb581d9b91c42d9b29c01"
"context": [
123,34,82,101,109,111,116,101,73,68,34,58,34,53,53,56,50,50,49,95,51,55,52,53,57,54,,
64,99,104,97,116,46,104,105,112,99,104,97,116,46,99,111,109,47,119,101,98,34,44,34,
84,121,112,101,34,58,34,99,104,97,116,34,125
]
},
"messages": [{
"body": "Hello system, how are you?",
"interaction": {
Domain": "",
"task" : "",
"parameter": null,
```

-continued

```
"actions": []
}
}],
...
}
```

In some inventive aspects, in the above example, ellipsis in the system standard JSON format include specific annotations related to the communication platform and/or the incoming message as described herein.

In some instances, the standard JSON format can include three parts. For example—

System standard (JSON)

{
"sender context": {
"profile_id": 1,
"organization_id": 1,
"provider_id": 3,
"account_uid": "558221_3745966@chat.hipchat.com/web",
"channel_id" : "558221_3745966@chat.hipchat.com/web",   } Part 1
"bot_id": 1,
"type" :0,
"public" : false,
"targeted" :0
},
"return route" : {
"uri" : "hipchat://127.0.0.1/20f8eacc702bb581d9b91c42d9b29c01"
"context" : [
123,34,82,101,109,111,116,101,73,68,34,58,34,53,53,56,50,49,95,51,55,52,53,57,54,,
64,99,104,97,116,46,104,105,112,99,104,97,116,46,99,111,109,47,119,101,98,34,44,34,8   } Part 2
4,121,112,101,34,58,34,99,104,97,116,34,125
]
},
"messages" : [{
"body" : "Hello system, how are you?",
"interaction" : {
Domain": "",
"task" : "",                 } Part 3
"parameter" : null,
"actions" : []
}
}],
...
}

As illustrated in the example above, the first part indicates identification information, such as, the user, channel used for communication, bot used for communication, organization that the user belongs to, and/or the like. The second part indicates information for dispatch controller 102 to send a response back to the user. For example, the return route or return provider for the outgoing message. The second part also includes keys that reference identifier values in the memory. For example, keys that reference profile_id, organization_id, account_uid, bot_id, provider_id, and channel_id in the memory. The third part indicates the body of the message. This part also includes system-generated annotations, such as context clues that aid in resolving the context for the incoming message, and other generated data.

Thus, in inventive aspects the dispatch controller 102 of the system 100 shown in FIG. 1 normalizes incoming messages from a user such that other components/controllers of the system 100 need not be concerned about platform-specific identities or accounts. For example, if a single user interacts with system 100 across two communication platforms (e.g., a chat-client and an SMS service), dispatch controller 102 obtains incoming schema messages via one or more bots from either or both communication platforms, extracts identifiers associated with user identity and maps each of the incoming message to an internal profile of system 100. In some inventive aspects, system 100 may include a memory/storage device, such as memory 108, that stores user identities of all users that have previously interacted with system 100 as internal profile of the users of system 100. Appropriate module in dispatch controller 102 may resolve incoming schema messages from either or both communication platforms to a common internal profile associated with the user and provides the user with access to all of their internal data (including from both platforms) within system 100. In some inventive aspects, memory/storage device may include at least one mapping of incoming schema message associated with different providers/communication platform. That is, an incoming schema message format may be associated with a communications platform. Some non-limiting examples of communications platforms/providers are chat-clients, SMS, email, audio and/or video files, streaming audio and/or video data, Voice over IP (VoIP), videoconferencing, unified messaging, and customized web front-ends.

Figure 4:
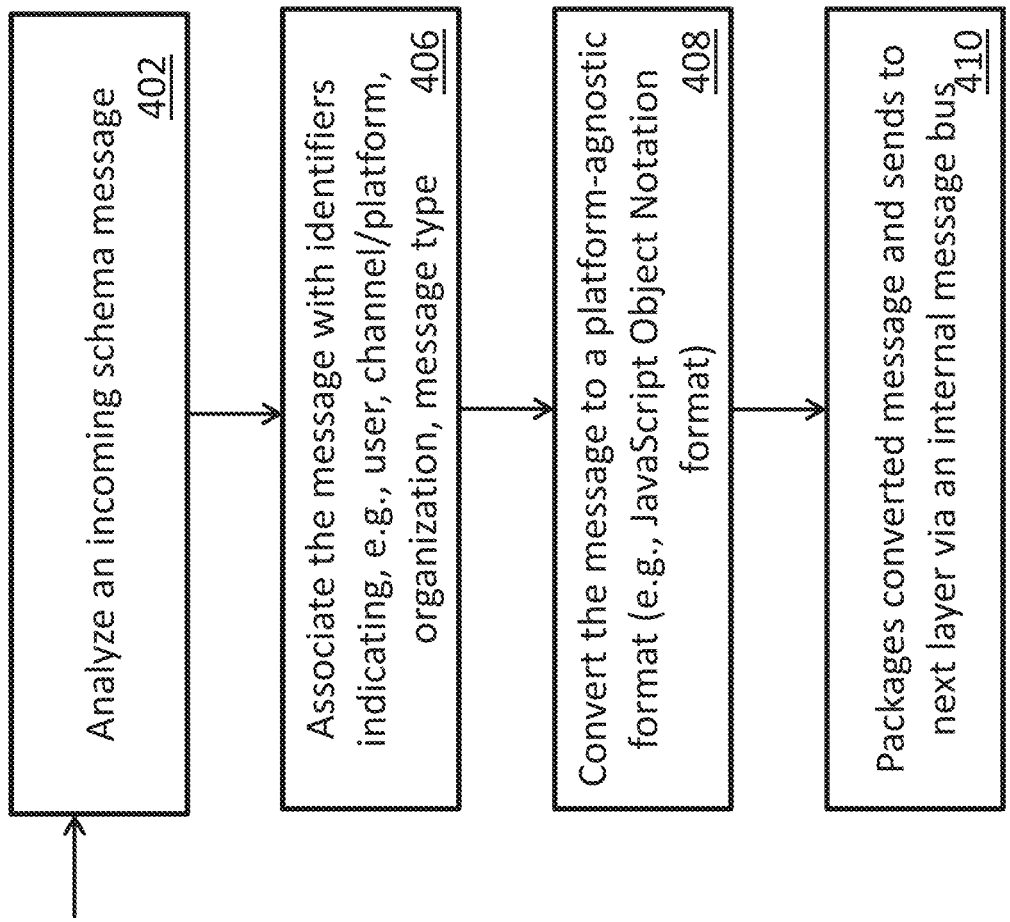
FIG. 4 is a flow diagram illustrating a method for dispatching an incoming message in accordance with some inventive aspects.

FIG. 4 is a flow diagram illustrating a method 400 for dispatching an incoming schema message in accordance with some inventive aspects. The system obtains (at a bot) an incoming message via a communication platform (e.g., chat-clients, SMS, email, customized web front-ends, VoIP, videoconferencing, unified messaging, etc.) and pushes the incoming schema message (incoming message that is transformed to the schema of the communication platform) for further processing. At 402, system analyzes the incoming schema message. At 406, the system may associate the incoming message with identifiers indicating the user, platform through which the message was received and/or message type. In some inventive aspects, the system further associates the incoming message with basic information such as a response/outgoing message route designated for responding to the user or the organization to which the user belongs. At 408, the incoming message may be converted to a platform-agnostic format or a standard serialized format normalizing the message for use by downstream components. Some examples of standard serialized format may include JavaScript Object Notation (JSON) format, etc. At 410, the converted message may be packaged into one or more packets of metadata (e.g., a JSON string) and the initial formatted message is sent to the next controller via an internal message bus. Hence, the dispatching method 400 converts a platform-specific incoming message to platform agnostic initial formatted message.

Dispatch controller 102 is further configured to process outgoing response messages that are obtained from other components/controllers of the system 100 and that represent feedback and/or content relating to the execution of one or more of a variety of skills/actions and/or various types of information pursuant to the incoming message. The method for dispatching an outgoing schema message is further illustrated in FIG. 10 as disclosed herein.

Processing and Routing Controller

In some inventive aspects, initial formatted message from dispatch controller 102 is sent to processing and routing controller 104 via an internal message bus. Processing and routing controller 104 is responsible for natural language processing from a natural language expression. The primary functionality of processing and routing controller 104 includes determining user intent from an incoming message, extracting any pertinent details to carry out the user intent, and providing any additional, contextual data.

In some inventive aspects, processing and routing controller 104 may include two modules. The first module (also referred to as "dispatcher module" herein) includes a series of message attribute processing controllers and a number of augmented message routers. The message attribute processing controllers analyze the initial formatted message and add further contextual information to the initial formatted message. The augmented message routers then determine the user intent and route the messages accordingly. The second module (also referred to as "server module" herein) includes various machine learning techniques such as maximum entropy classification, Naive Bayes classification, a k-Nearest Neighbors (k-NN) clustering, Word2vec analysis, dependency tree analysis, n-gram analysis, hidden Markov analysis, probabilistic context-free grammar, and/or a combination thereof. This module may also include implementation of natural language processing techniques, data science models, and/or other learning techniques. The various machine learning models/techniques, natural language processing techniques, data science models, and other learning techniques may be exposed to the first module and the other controllers via web service endpoint (e.g., HTTP endpoints). That is, the message attribute processing controllers or the augmented message routers may access various models and/or techniques included in the second module via HTTP endpoints to process the initial formatted message. In some inventive aspects, the message attribute processing controllers and augmented message routers may access portions of different models and/or techniques. In other inventive aspects, the message attribute processing controllers and augmented message routers may access an entire machine learning technique via a HTTP endpoint to process the messages further. In a similar manner, these models and/or techniques are also exposed to dispatch controller 102 and task controller 106 via web service endpoints.

Figure 5:
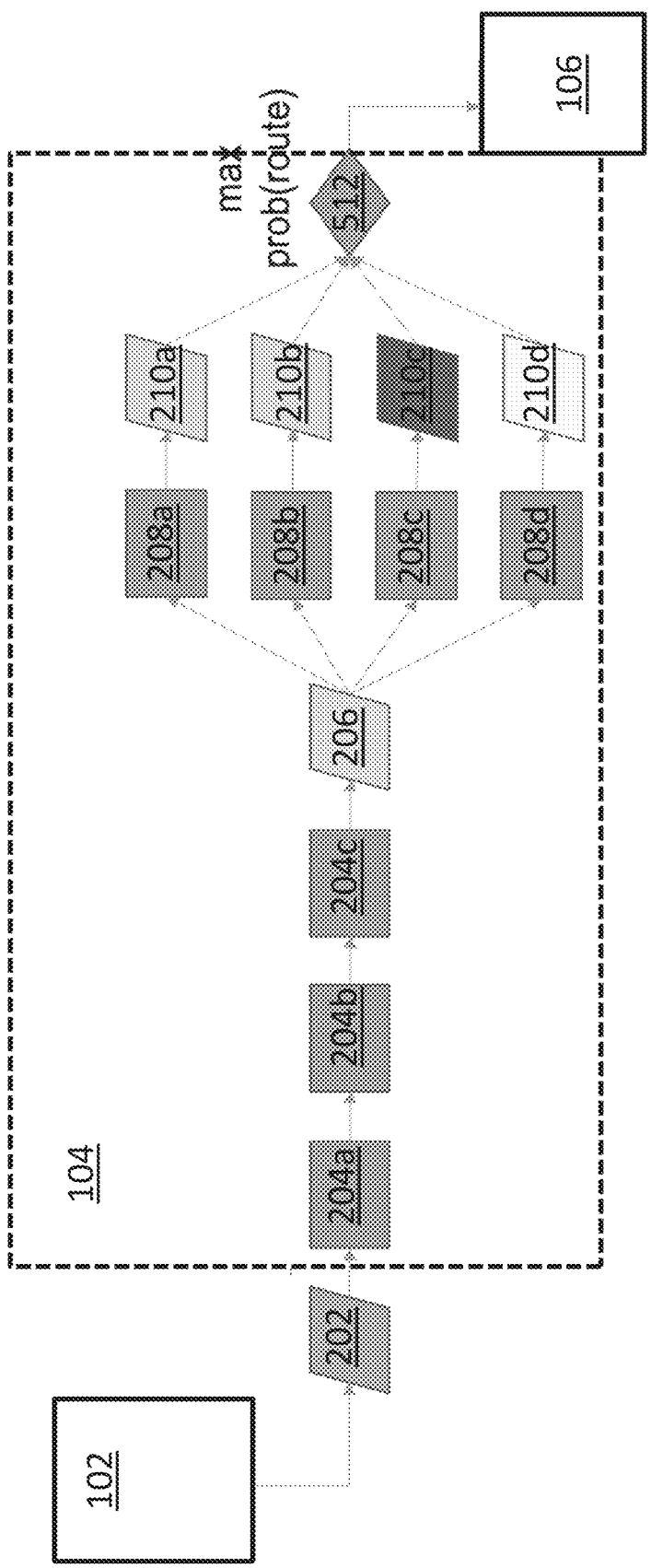
FIG. 5 is a block diagram illustrating a processing and routing controller in accordance with some inventive aspects.

FIG. 5 is a block diagram illustrating processing and routing controller 104 in accordance with some inventive aspects. Dispatch controller 102 may send formatted and packaged JSON string data/initial formatted message 202 to processing and routing controller 104 via an internal message bus. In some inventive aspects, the JSON string data/initial formatted message 202 is obtained by processing and routing controller 104, which includes at least one message attribute processing controller 204 for example a series of message attribute processing controllers 204*a*, 204*b* and 204*c*, for examining initial formatted message 202 that include identifiers that are associated with incoming message. The identifiers are associated by dispatch controller 102.

Message attribute processing controller 204 (e.g., a series or parallel sequence of message attribute processing controller) examines the natural language input in an incoming message, along with corresponding identifiers within initial formatted message 202, such as a user identifier indicating the user, a platform identifier indicating the communications platform or platform over which the incoming message was obtained, and/or a message type identifier indicating a type of incoming message. Message attribute processing controller 204 operates to mutate the initial formatted message by identifying patterns within the initial formatted message. Message attribute controller can then modify the initial formatted message to add further contextual information for more efficient processing. For example, a message attribute processing controller 204 may be configured to determine whether the incoming message is directed to a particular entity. If so, the message attribute processing controller 204 may modify the message to remove the information directing the incoming message to the particular entity and, instead, annotate initial formatted message 202 by associating initial formatted message 202 with an indication that the incoming message was directed to the particular entity (e.g., "True"). Other examples of patterns include, but are not limited to, the inclusion of date, time, and location information.

In some inventive aspects, a message attribute processing controller 204 may be a short program that inspects initial formatted message 202 to modify and annotate the message for more efficient use by downstream components. Some non-limiting examples of message attribute processing controllers include the following:

1) A "DebugMessage" processing controller detects if the message has the form "debug 'message.'" This processing controller extracts the message part and annotates the data with the key-value pair message["debug"]= True.
2) A "StopMessage" processing controller detects if the message includes any of a set of termination terms such as "stop," "cancel," "quit," etc. This processing controller annotates the data with the key-value pair message["stop_message']=True.

3) A "ParameterProcessor" extracts parameter arguments from the message. For example, if the message contains a string that can be interpreted as a date or time then date and time are extracted as parameter arguments. If date and time are found, the relevant string is removed and datetime representations are added as message ["extracted_time_intents"]=times.

According to some inventive aspects, an example code for message attribute processing controllers is included below.

```
import json
import logging
import re
import yaml
from magic.data.models import ScriptStates, Bots
from magic. extractor import TimeIntentExtractor, Extractor
from magic.models.sentiment.vader import VaderSentimentAnalyzer
class DebugMessage(object):
    def process(self, profile, message):
        # try to extract a message in the form: debug "some command"
        match = re.match("^debug\s+\"(*)1"", message["body"] )
        if match:
            message["debug"] = True
            message["body"] = match.group(1)
        return message
class StopMessage(object):
    def process(self, profile, message):
        stop_regex = "^(stop\never\s?mind\abort\cancel\quit\forget\s+it)\\b"
        match = re.match(stop_regex, message["body"] , re.IGNORECASE)
        if match:
            message["stop_message"] = True
            message["stop_text"] = match.group(1)
        return message
class QuestionMessage(object):
        """
        Annotates a message specifying whether it is suspected of being a question
        or not, used by some routers. For the time being, simply checks for a
        question mark, though in the future should use some more sophisticated
        method.
        """
        def process(self, profile, message):
            question_regex = ".*\? [\W\!]*$"
            match = re.match(question_regex, message["body"] , re.IGNORECASE)
            if match:
                message["is_question"] = True
            return message
class HelpMessage(object):
    def process(self, profile, message):
        help regex = "^(help)\\b"
        match = re.match(help_regex, message["body"] , re.IGNORECASE)
        if match:
            message["help_message"] = True
            message["help_text"] = match. string
        return message
class NLIDBMessage(object):
    def process(self, profile, message):
        if message['body'][:5] == 'nlidb':
            message['body'] = message['body'][6:]
            message['enable_nlidb'] = True
        return message
class RecommenderMessage(object):
    def process(self, profile, message):
        if message['body'][:9] == 'recommend':
            message['body'] = message['body'][10:]
            message['is_expert_request'] = True
        return message
class DateProcessor(object):
    """
    Parses any dates out of the body and annotates as 'extracted_dates'.
    """
    def process(self, profile, message):
        # all these values could be populated upstream.
        # in fact profile_id and organization_id already are.
        ctx = {
            'profile_id': profile.id,
            'organization_id': profile.organization,
            'timezone': profile.timezone
        }
```

```
            body, times = TimeIntentExtractor.extract(ctx, message, message["body"],
                                       { })
            message["extracted_time_intents"] = times if times is not None else [ ]
            return message
    class ParameterProcessor(object):
        def __init__(self):
            with open('data/extractions.json') as fh:
                self.extractions = json.load(fh)
        def process(self, profile, message):
            """
            Extracts parameters for the current task.
            """
            (domain, task) = self_current_task(message)
            message['new_parameters'] = selfextract_params(profile, message,
                                        domain, task)
            return message
        def extract_params(self, profile, message, domain, task):
            extractor = Extractor (None, None)
            if profile is not None:
                extractor = Extractor(profile.id, profile.organization,
                            profile.timezone)
            key = "{ }.{ }".format(domain, task)
            extractions = self.extractions.get(key, None)
            parameters = message.get('parameters', { })
            if extractions is not None:
                # Start with any previous parameters, for example, those that get
                # regex matched.
                for k, v in parameters.copy( ).items( ):
                    results = extractor.extract(message, v, {k: extractions[k]},
                              True)
                    valid = k in extractions and k in results
                    if not valid:
                        del parameters[k]
                results = extractor.extract(message, message['body'], extractions)
                for k, v in results.items( ):
                    parameters[k] = v
            return parameters
        def _script _state(self, message):
            profile = message["sender_context"]["profile_id"]
            return ScriptStates.get(ScriptStates.profile == profile)
        def _current_task(self, message):
            """
            Returns a tuple containing the domain & task for the current task,
            assuming that
            """
            try:
                script state = self._script_state(message)
                (domain, task) = script_state.script_name.split('.')
                context = yaml.load(script_state.serialized_context)
                if context is not None and 'skill' in context:
                    # some tasks execute on behalf of other skills...
                    (domain, task) = context ['skill'].split('.')
                logging.info("Current task: { }.{ }"format(domain, task))
                return domain, task
            except Exception as e:
                logging.warning("Could not find current task: { }".format(e))
                # no script state means no task running
                return None, None
    class SentimentProcessor(object):
        """
        Detects sentiment(neg/pos/neu) of the message and annotates as 'sentiment'.
        """
        def __init __(self):
            self sa = VaderSentimentAnalyzer ( )
        def process(self, profile, message):
            sentiment = selfsa.prob_classifiy(message['body'])
            message['sentiment'] = sentiment. max( )
            return message
```

In FIG. 5, a series of message attribute processing controllers 204 is used to analyze the JSON string data/initial formatted message 202 to identify specific features. In some inventive aspects, processing and routing controller 104 includes at least one message attribute processing controller, such as, for example, a parallel sequence of message attribute processing controllers and/or a serial sequence of message attribute processing controllers (e.g., message attribute processing controllers 204a, 204b, and 204c) which can identify at least one specific feature. Message attribute processing controllers 204 may modify initial formatted message 202 based on any specific features determined during processing.

In FIG. 5, modified/augmented message 206 is sent from the message attribute processing controllers 204 to a sequence of augmented message routers 208. In some inventive aspects, processing and routing controller 104 includes at least one augmented message router, such as, for example, a serial sequence of augmented message routers and/or a parallel sequence of augmented message routers (e.g., routers 208a, 208b, 208c, and 208d). Augmented message routers 208 may be responsible for routing the message to task performance controller 106 as an annotated block of data by extracting relevant information from augmented message 206.

In some inventive aspects, modified/augmented message 206 is sent to each augmented message router in the sequence of augmented message routers 208. The modified/augmented message 206 can be sent to each augmented message router in the sequence of augmented message routers in any order. Each augmented message router processes the augmented message and matches the augmented message to one or more domains and/or tasks. In some aspects, a domain may be a broad collection of skills and a task may be a specific action (e.g., Domain: QuestionIdentification, Task: unknown_question). Some augmented message routers may match augmented message 206 against a large range of domains and/or tasks while other augmented message routers may match augmented message 206 to a specific domain and/or task. Each augmented message router then determines the user intent based on this matching. In other words, each augmented message router processes augmented message 206 and determines a user intent for the message. That is, two augmented message routers may determine two different user intents for the same augmented message. The logical effect of this implementation of passing an augmented message through every augmented message router in a sequence of augmented message routers (in series or in parallel) is that the augmented message is processed in parallel.

In some inventive aspects, each augmented message router can access the same models and/or techniques included in the second module of processing and routing controller 106. For example, two augmented message routers may access two out of three of the same models and/or techniques. However, each of the two augmented message routers may access a different model and/or technique as a third model and/or technique.

In some inventive aspects, an augmented message router takes a processed message payload/augmented message 206 and attempts to match it to user intent (e.g., domain, task). An augmented router may contribute further annotations to augmented message 206 to indicate domain, task, and/or other extracted parameters to be used by task performance controller 106 while executing the skill. Some augmented message routers may attempt to match against a large range of domains and/or tasks, while others may only detect a particular domain or task. Some non-limiting examples of augmented message routers include the following:

1) "RegexRouter" detects if the message exactly matches a predefined pattern using regular expressions. These patterns may be automatically generated from a list of example statements per skill. Arguments needed by the detected skill may also be extracted using the regular expressions. In some inventive aspects, these augmented message routers may contain a file or database that saves extracted information. The file or database may include a list of regular expressions and corresponding skills. With every iteration, if a new skill is identified, the regular expression and the new skill are stored in the file. The file is parsed during runtime to identify the intent based on the expression.

2) "TextblobRouter" classifies the message as a known skill using a classifier such as a trained maximum entropy classifier. The classifier may be trained from a file or database including a list of example statements and corresponding skills. This may be the same file used to generate regular expressions. Arguments needed by a detected skill may be extracted using a set of relevant extractor methods including, for example, methods for strings, numerics, datetimes, URLs, people names, etc. These extractor methods may be based on one or more algorithms, including regular expressions and other machine learning tools, depending on the item to be extracted. For example, some extractors may identify items of information relating to the time that the message was sent or the title of the message. These items of information may then be stored in a file or database and accessed to obtain parameters while implementing machine learning techniques.

3) "SocialGracesRouter" detects if the message is a common social utterance, such as "hi," "hello," "thanks," etc.

4) "QuestionRouter" detects if the message is a question. If it is a questions, this router may attempt to classify the question as one of several known questions stored in a file or database in order to identify a known answer. In some inventive aspects, the classification method is a hybrid model based on one or more algorithms such as Naive Bayes classification, sentence embedding, and k-NN classification. A Naive Bayes classifier may match a question based on a level of occurrence and co-occurrence of one or more key words. Sentence embedding may convert each word in a sentence into a numeric vector representation of that word; then the vectors of each word in the sentence are averaged for a single numeric vector representing the entire sentence. A k-NN classifier may match an average numeric vector resulting from sentence embedding of an input message with known average numeric vectors resulting from sentence embeddings of canonical questions by, for example, the average label of the k-closest samples to the input (using cosine similarity for a distance metric).

According to some inventive aspects, an example code for a default augmented message router is included below—

```
from .router import Router
class DefaultRouter (Router):
    def __init__(self):
        super(DefaultRouter, self,).__init__( )
    def route(self, profile, message):
        if not 'domain' in message or not 'task' in message:
            message['domain'] = 'Default'
            message['task'] = 'unrouted_message'
            message['probability'] = 0.0
        return message
```

According to some inventive aspects, an example code for a "SocialGracesRouter" augmented message router is included below—

```
import csv
import pickle
import os
import re
```

```
import logging
from .router import Router
from .utils import normalize, train_max_ent, null_questions
import magic
dataset_path = 'benchmark/social-graces.csv'
cached_path = (os.path.dirname(os.path.realpath(__.file__)) +
        "/../../data/cached_social_graces_classifier.pickle")
def default_data_set( ):
    f = csv.reader(open(dataset_path))
    return list(map(
        lambda y: (y[0].lower( ), y[1] + '.' + y[2]), [i for i in f]))
def social_graces_classifier( ):
    logging.info("Loading cached classifier...")
    return pickle.load(open(cached_path, 'rb'))
# Router for social graces such as salutations, benedictions.
class SocialGracesRouter(Router):
    def __init__(self, classifier = None):
        super(SocialGracesRouter, self).__init__( )
        self.classifier = classifier
        if self.classifier is None:
            self.classifier = social_graces_classifier( )
    def train(self):
        logging.info("Training new classifier...")
        classifier = train_max_ent(default_data_set( ) + null_questions( ))
        pickle.dump(classifier, open(cached_path, 'wb'))
    def route (self, profile, message):
        result = self.classifier.prob_classify(normalize(message['body']))
        if (resultprob(result.max( )) > 0.80 or 'debug' in message) and re.match("^NULL-", result.max( )) is None:
            (domain, task) = result.max( ).split('.')
            message['domain']    = domain
            message['task']      = task
            # clamp probability lower to give priority to functional skills
            # and not trigger "override" behaviors
            message['probability'] = min(magic.SOCIAL_PROBABILITY_CLAMP_VALUE, result.prob(result.max( )))
            return message
        return None
```

According to some inventive aspects, an example code for a "QuestionRouter" augmented message router is included below—

```
import sys
import os
import logging
import pickle
import json
import peewee
from .router import Router
from .feature_extractor import features
import magic.models.manager
import magic.models.qa as qa
import magic.models.qafilters as filters
from magic.extractor import Extractor
from magic.models.qarecommender import QARecommenderBuilder
from collections import namedtuple
from magic.data.models import Question_Texts, CanonicalQuestions, fn, database
from playhouse.postgres_ext import Match
from datetime import datetime
QAResult = namedtuple('QAResult', ['probability', 'cqid', 'qtid'])
class QuestionRouter(Router):
    # queue - queue for inline training of models
    def __init__(self, queue):
        super(QuestionRouter, self).__init__( )
        self.training_queue = queue
    def route (self, profile, message):
        if message['body'] == '' or not Router.enabled_for_bot(self.bot(message).bot_type, "QuestionIdentification"):
            return None
        # Having arrived here with the belief that this is a question of
        # some kind, we can start with the classification of unknown_question,
        # which will be updated below if a specific question matches.
        message['probability'] = magic.QA_PROBABILITY_CLAMP_VALUE
        message['domain'] = 'QuestionIdentification'
        message['task'] = 'unknown_question'
```

```
            message['parameters'] = {'qa_model_version': str(qa.MODEL_VERSION)}
            bot_id = message['sender_context']['bot_id']
            message = self.route_with_classifier_builder(profile, message,
        qa.QuestionClassifierBuilder(bot_id, self.training_queue))
            if message['task'] == 'unknown_question':
                # try again with global scope
                message = self.route_with_classifier_builder (profile, message,
        qa.QuestionClassifierBuilder(None, self.training_queue))
            return message
        def route_with_classifier_builder(self, profile, message, builder):
            suggestions = [ ]
            prob = 0.0
            # Want to move to the below:
            # classifier, cache_version = builder.fetch_classifier( )
            classifier, stale, cache_version = builder.fetch_classifier( )
            if classifier is None:
                logging.info("NO CLASSIFIER FOUND, SKIPPING for bot_id
        { }".format(builder.bot_id))
                return message
            suggestions = filters.filter_questions(
                filters.canonical_questions(builder.bot_id),
        [filters.is_not_null_question.filters.minimum_confidence_threshold(magic.QA_MINIMU
        M_CONFIDENCE_THRESHOLD)] ,
                classifier,
                message['body'],
            )
            if stale:
                cache_time = datetime.fromtimestamp(int(cache_version.split('-')[0]))
                search_results = QuestionTexts.select( ) \
                    .join(CanonicalQuestions, on=(CanonicalQuestionsid ==
        QuestionTexts.canonical question)) \
                    .where(
                        (QuestionTexts.created_at > cache_time) &
                        (CanonicalQuestions.bot == builder.bot_id) &
                        Match(QuestionTexts.text, peewee.SQL("%s",
        "'{ }'".format(message['body'].replace("'" , " "))))
                    )
                suggestions += [QAResult(cqid=result.canonical_question, qtid=result.id,
        probability=magic.QA_PROBABILITY_THRESHOLD) for result in search_results]
            if 'debug' in message:
                # If debugging, populate the max even if we don't end up
                # resolving to an answer.
                message['probability'] = prob
                message['parameters'] = ["canonical_question_ids": [x.cqid for x in
        suggestions]}
            for found in suggestions:
                logging.info("qa match found ({ }): { }".format(found.cqid, found.probability))
            logging.info("number of qa matches after filtering: { }".format(len(suggestions)))
            if len(suggestions) > 0:
                prob = suggestions[0].probability
            if prob >= magic.QA_PROBABILITY_THRESHOLD:
                if len(suggestions) > 0:
                    message['task'] = 'suggest_questions'
                    message['parameters'] = {
                        'qa_model_version': str(qa.MODEL_VERSION),
                        'answers': [{'probability': i.probability, 'canonical_question_id': i.cqid,
                            'question_text_id': i.qtid} for i in suggestions],
                    }
                    # clamp probability lower to give priority to functional skills
                    # and not trigger "override" behaviors
                    message['probability'] = min(prob, magic.QA_PROBABILITY_CLAMP_VALUE)
                    recommender = QARecommenderBuilder(message['sender_context']['bot_id'],
        self training_queue).fetch_model( )
                    if recommender is not None:
                        message['recommended_profile_ids'] = [i for i in
        recommender.profile_recommendations(message['body']) if i[0] is not None]
                        message['recommended_tags']     = [i for i in
        recommender.tag_recommendations(message['body'])   if i[0]is not None]
                        logging.info("QA: adding profile IDs and tags ({ },
        { })".format(message['recommended_profile_ids'], message['recommended_tags']))
            return message
```

In some inventive aspects, the domain-specific functionality of augmented message routers may include, but are not limited to, knowledge-based and question-and-answer routing, natural language routing, and routing to invoke tasks and/or workflows. Augmented message routers that function within a domain of invoking tasks and/or workflows may resolve incoming messages by invoking specific tasks. For example, the incoming message "schedule a meeting with Bob and Sally" may be invoked in this domain. Augmented message routers that function within a domain of natural language resolve incoming messages by locating saved resources (e.g., a file or database in memory) and generating an appropriate query based on the natural language input. For example, the incoming message "how many users signed up yesterday?" may be invoked in this domain. Knowledge-base/question-and-answer routers may resolve incoming messages to specific entries in a preexisting knowledge base (e.g., a file or database in memory). For example, the incoming message "where do I find the company calendar" may be invoked in this domain.

In FIG. 5, the routed (and annotated) messages 210 from each router including, for example, routed messages 210a, 210b, 210c, and 210d, are routed by the corresponding routers, 208a, 208b, 208c, and 208d respectively. These routed messages 210 may include or be further analyzed to determine corresponding probabilities of correctly interpreting the incoming message and determining the user intent. In some inventive aspects, each router determines a probability score. A decision policy may be implemented to determine a winning augmented message router. The output of the winning augmented message router (i.e., routed message (210a, 210b, 210c, or 210d) from the winning augmented message router) is considered in 512. The routed message may include the domain and/or task determined by the winning augmented message router in standard serialized format. In some inventive aspects, the routed message with the highest probability score is considered in 512. For instance, if the probability score of routed message 210c from router 208c is the highest probability score and/or meets a predetermined threshold for probability scores, then message 210c is considered. Fully annotated routed message 210c is then sent to task performance controller 106 via the internal message bus.

An important functionality of processing and routing controller is Natural Language Understanding (NLU)—from a natural language utterance. Processing and routing controller 104 determines the user intent, extracts any pertinent details to carry out the intent, and provides any additional, relevant contextual data. After useful data is harvested from a natural language utterance and user intent is determined, processing and routing controller 104 may send harvested data and user intent to task processing controller 106 to execute the user intent.

In some inventive aspects, at least one message attribute processing controller (e.g., a series or parallel sequence of message attribute processing controllers) processes and modifies the initial formatted message. The modification is performed to extract valuable information from the initial formatted message. For example, an incoming message may be directed to the system (e.g., a name associated with the system) and the incoming message may include the term "@system" in the message. A dispatch controller may format the message and process the message by associating identifiers (e.g., user identity, communication platform from which the message is obtained, etc.) with the incoming message. The formatted initial message may then be sent to a processing and routing controller including at least one message attribute processing controller. In some inventive aspects, the initial formatted message is sent through each message attribute processing controller, and each message attribute processing controller may further modify the message appropriately. For example, a message attribute processing controller handling "@system" requests, may process the message to remove the "@system" term and retain only the body of the message. This or another message attribute processing controller further may perform pattern matching and send annotated data with key-value pair/augmented message to at least one augmented message router for routing.

In some inventive aspects, the formatted initial message may be sent to at least one message attribute processing controller (e.g., a series or parallel sequence of message attribute processing controllers). Each message processing controller may analyze the message but not may leave the formatted initial message unchanged. For example, if an identifier corresponding to at least one of the message attribute processing controller is not present in the formatted initial message, the formatted initial message may not be modified. In such inventive aspects, the formatted initial message is transmitted to at least one augmented message router for further processing. In other words, although the formatted initial message passes through a series or a parallel sequence of message processing controllers, it is possible that the formatted initial message may remain unchanged until it reaches an augmented message router.

In some inventive aspects, at least one augmented message router is responsible for routing the augmented message to an appropriate task performance controller component by extracting relevant information from the augmented message and routing the message as an annotated block of data. Each augmented message router may be domain specific and/or function specific. The augmented message obtained at each router may be further processed by the augmented message router provided that the augmented message is within the domain of that specific router. In some inventive aspects, the augmented message is sent through each augmented message router. If an augmented message router does not respond to the message, then the augmented message router does not return any data. As the augmented message is further processed by the augmented message routers, the data is further annotated and the extracted information may be saved in a memory device/storage. An augmented message router may access machine learning techniques via HTTP endpoints to classify and route the data. Some non-limiting examples of machine learning techniques employed in processing and routing controller 106 are maximum entropy classification, Naive Bayes classification, a k-Nearest Neighbors (k-NN) clustering, Word2vec analysis, dependency tree analysis, n-gram analysis, hidden Markov analysis and probabilistic context-free grammar. In some inventive aspects, a memory device/storage may provide parameters for the machine learning algorithms from saved information/data. The probability score of a fully annotated routed message from each router may be analyzed, and a decision policy may be implemented to send the routed message to a task performance controller. In some inventive aspects, the decision policy may include comparing the probability score of the fully annotated message from each router and determining at least one domain and/or task based on the comparison to send the routed message to the task performance controller. In some inventive aspects, the decision policy may include comparing contextual information in the augmented message. That is, the decision policy may include comparing information that is external to the augmented message routers. The message processing controllers may add contextual information such as recent message history, time of day, provider through which the message was obtained, the user generating the information, and/or the like to the augmented message. The decision policy may include comparing this contextual information to route the message to the task performance controller.

According to some inventive aspects, pseudocode for a processing and routing controller or (e.g., the routine which runs an incoming message through a progression of processors to mutate and annotate the message followed by a progression of routers, from which the highest probability response is selected as the action to take) includes the following:

```
routine main( ):
    processors = [Processor1, Processor2, ...]
    routers = [Router1, Router2, Router3, Router4, ...]
    dispatcher = Dispatcher(processors, routers)
    on new message:
        dispatcher.dispatch(message)
    routine dispatch(message):
        for each processor in processors:
            message = processor.process(message)
        responses = new list
        for each router in routers:
            response = router.route(message)
            if response is valid:
                append response to responses
        best_response = response in responses with highest probability
        send message to best_response endpoint with a return route
```

According to some inventive aspects, message data includes the following:

```
message =
{
    body: "add task to complete documentation due at 4pm",
    profile_id: 12345,
    debug: false,
    domain: "Tasks",
    task: "create_task",
    probability: 0.99,
    parameters: {title: "complete documentation", due:
    (2016, 09, 15, 16, 0)}
}
```

Processing and routing controller 104 may be configured further to store relevant information in/readily access any information from one or more memory devices, such as memory device 108.

In some inventive aspects, once the user intent is determined, multiple entities may be extracted from the message to serve as tags for the routed message. The result of extraction by the processing and routing controller 104 may be a message associated and/or tagged with a "domain," "task," "parameters," another indicator, and/or a combination thereof. For example, the incoming message "schedule a meeting with Bob and Sally" may be classified as a "schedule_meeting" command, which may have various parameters, such as "attendee," "location," "date," and "time." The incoming message is then processed to automatically extract parameters present in the incoming message. For example, the names "Bob" and "Sally" may be automatically recognized as names (e.g., in the user's organization) and associated with the "attendee" parameter in the "schedule_meeting" command.

Processing and routing controller 104 may be configured further to store relevant information in/readily access any information from one or more memory devices, such as memory device 108. In some inventive aspects, in addition to routing incoming messages, processing and routing controller 104 also may be configured to generate an outgoing message or response to the user following incoming message routing and/or task performance (e.g., performed by task performance controller 106). In some inventive aspects, one or more formats for responses are hardcoded. In other inventive aspects, the format of a response is processed dynamically and is given a "personality" using natural language generation. Processing and routing controller 104 may determine a personality intelligently based on, for example, the incoming message to which it is responding. For example, if an incoming message begins with a formal greeting, the outgoing message may be generated to begin with a formal greeting as well.

In this manner, processing and routing controller 106 is designed to add and/or remove specific functionalities in a granular manner. That is, the modular design for implementing message attribute processing controllers and augmented message routers makes system 100 scalable without impacting the scope of system 100. For example, to remove the functionality of invoking workflows, only the augmented message router implementing the domain that invokes tasks needs to be modified. Such modification is on a granular level and does not impact the scope of the entire system 100. Thus, the architecture of system 100 can be maintained while expanding its functionality and scaling it.

Figure 6:
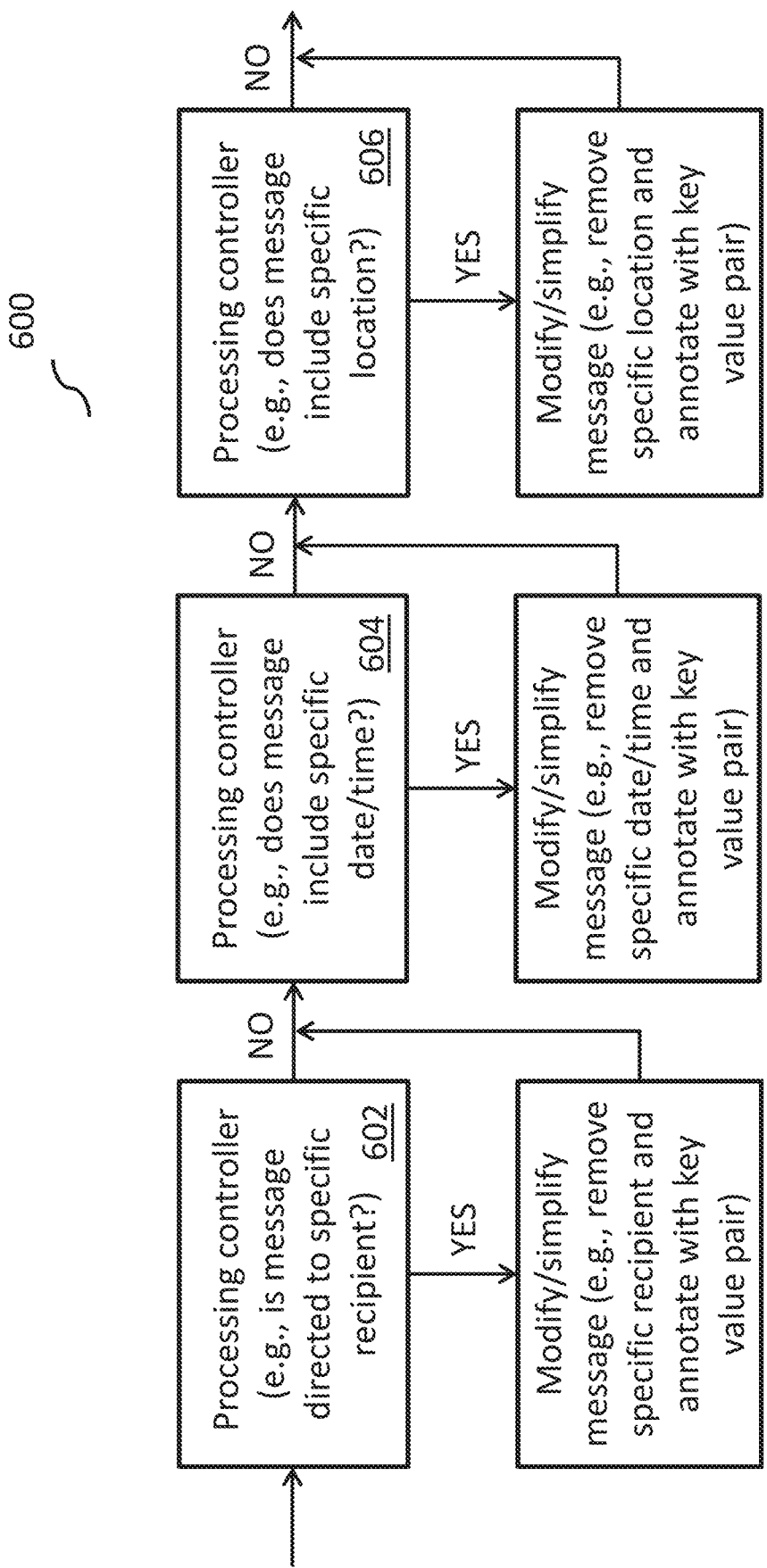
FIG. 6 is a flow diagram illustrating operation of a series of processors in accordance with some inventive aspects.

FIG. 6 is a flow diagram illustrating operation of a series of message attribute processing controllers in accordance with some inventive aspects. A processing and routing controller may include a series of message attribute processing controllers to process and modify initial formatted message. In some inventive aspects, each message attribute processing controller recognizes one specific feature. If the incoming message contains that specific feature, the message attribute processing controllers may modify the initial formatted message by removing the identifier associated with that particular specific feature. The message attribute processing controllers may then package the modified message (e.g., augmented message) as key-value pairs that indicate the identifier/associated specific feature. However, if the incoming message does not contain that specific feature the initial formatted message may be sent to the next processor for processing.

In method 600 of FIG. 6, message attribute processing controller 602 obtains the initial formatted message from a dispatch controller. Message attribute processing controller 602 recognizes specific recipients associated with the incoming message. For example, if the incoming message is addressed specifically to the system and contains "@system," message attribute processing controller 602 recognizes this feature. Message attribute processing controller 602 may then modify the initial formatted message by removing "@system" and annotating with key-value pair (e.g., message["@system"]=True). In some inventive aspects, the key-value pairs may be stored in containers such as hash-maps, dictionaries, and/or vectors. However, if the incoming message is not addressed or does not contain the specific recipient feature, then the initial formatted message is sent to message attribute processing controller 604 without modification. Message attribute processing controller 604 recognizes data/time information within the incoming message. If this specific feature is not present in the incoming message, the initial formatted message is then sent to the message attribute processing controller 606 for further processing (e.g., recognition of location information). In this manner, the formatted message is dispatched through each of the processor and is modified according to the features/patterns.

Figure 7:
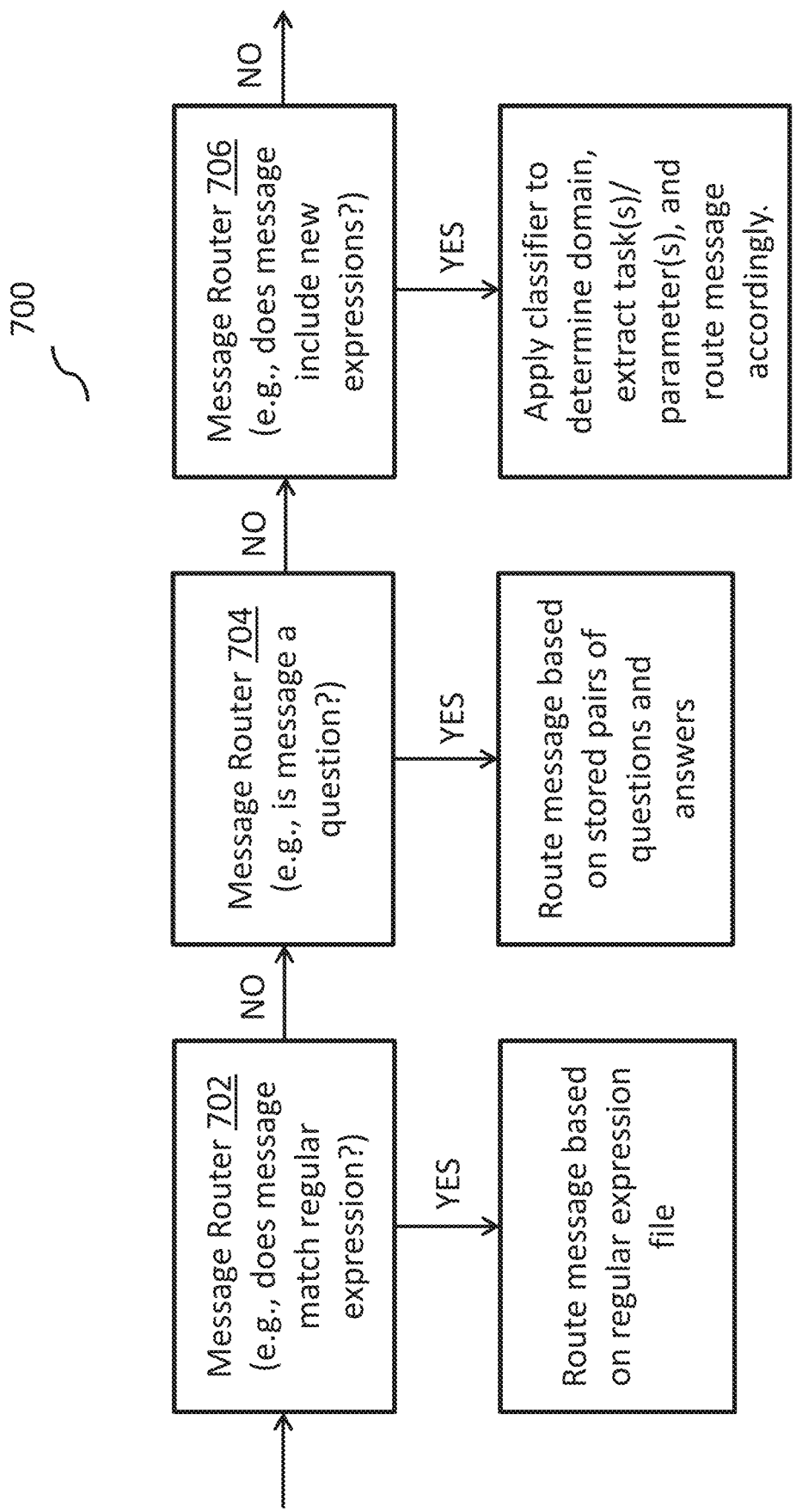
FIG. 7 is a flow diagram illustrating operation of a sequence of routers in accordance with some inventive aspects.

FIG. 7 is a flow diagram illustrating operation of a sequence of augmented message routers in accordance with some inventive aspects. In some inventive aspects, the sequence of augmented message routers is responsible for routing the data to an appropriate component by extracting relevant information. Each augmented message router may be domain specific and/or function specific. The augmented message/annotated and processed message from the at least one message attribute processing controller is sent to the sequence of augmented message routers. At each augmented message router, the augmented message may be further processed by the augmented message router provided that the message is within the domain of that specific router. In one inventive aspect, the augmented message is sent through each augmented message router sequentially. If an augmented message router does not respond to the augmented message, no data is returned. If the augmented message is within the domain and/or the function of the augmented message router, the augmented message router may respond by further processing the message and routing the message accordingly.

In method 700 of FIG. 7, an augmented message is first sent through a regular expressions router 702. If the augmented message exactly matches a predefined pattern using regular expressions, then the message is processed and routed via regular expressions message router 702. The regular expressions message router may include a file that saves extracted information that is parsed during runtime. This file may be updated dynamically or periodically.

If the augmented message does not match a predefined pattern, the augmented message is sent to a question-and-answer message router 704. Question-and-answer message router 704 detects if the message is a question (e.g., determines whether a question mark is used). If the message appears to be a question, then question-and-answer message router 704 may attempt to classify the question as one of several known questions stored in memory (e.g., a file or database) in order to determine the corresponding answer. The augmented message may be routed based on stored pairs of questions and answers.

If the augmented message is not recognized as a question, the message is sent to a natural language message router 706 that attempts to interpret new expressions. If the message includes new expressions, augmented message router 706 may process the data by applying a classifier to determine domain and to extract tasks. The processed data/routed message may be routed appropriately via message router 706. If the message does not include new expressions, the augmented message may be sent to another augmented message router within the sequence. In this manner, the augmented message is processed and routed sequentially. Alternatively, for example, if none of the augmented message routers are successful, a response may be sent to the user via the dispatch controller requesting more information for routing purposes.

Figure 8:
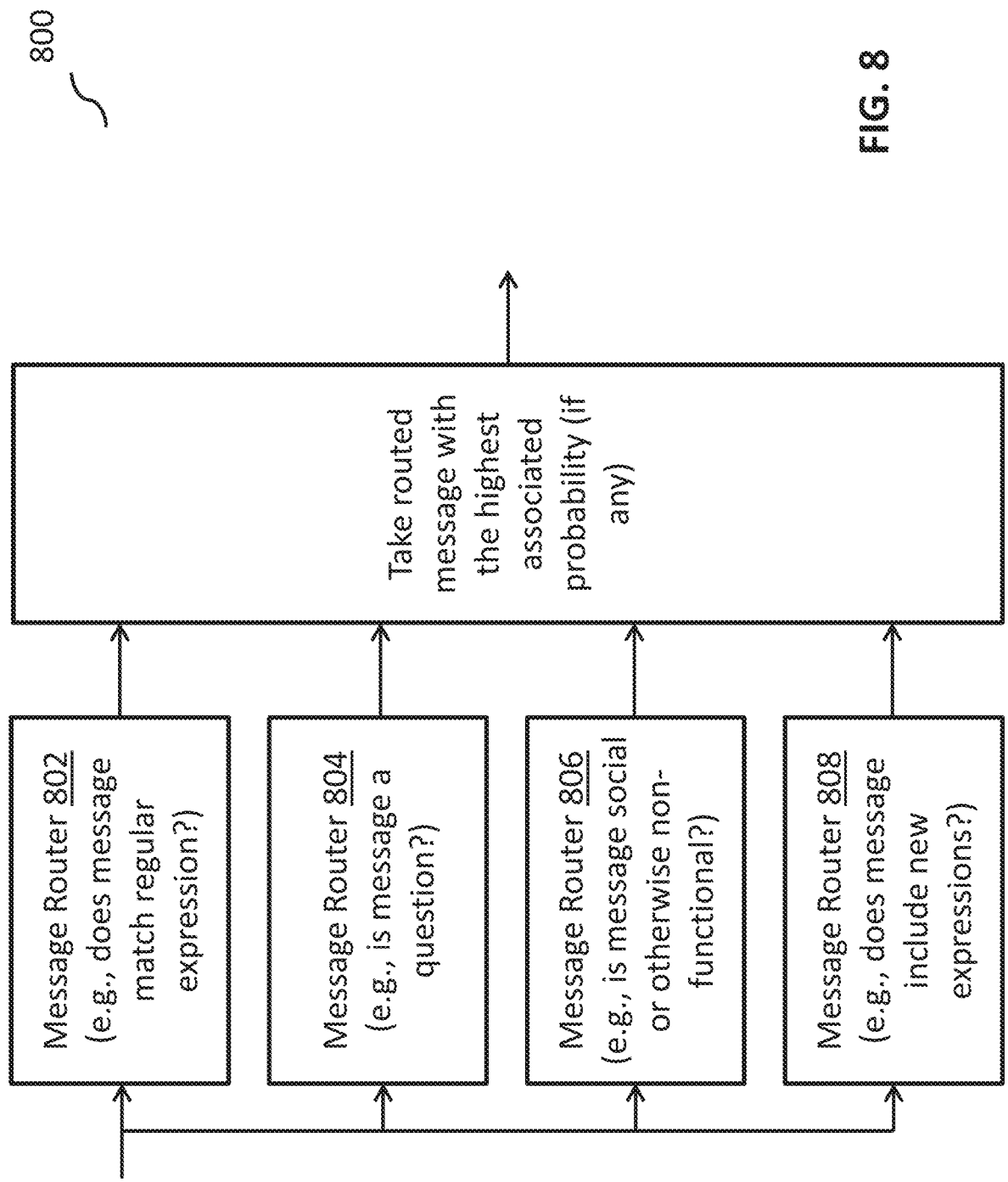
FIG. 8 is a flow diagram illustrating parallel operation of routers in accordance with some inventive aspects.

FIG. 8 is a flow diagram illustrating parallel operation of augmented message routers in accordance with some inventive aspects. In method 800, a processed message sent through multiple augmented message routers 802, 804, 806, and 808 in parallel (e.g., simultaneously). If the augmented message is not within the domain/function of an augmented message router, the augmented message router does not return any data. However, if the augmented message falls within the domain of an augmented message router, the augmented message router processes the message and returns a router-specific copy of the message including, for example, a probability score indicating the likelihood that the augmented message router accurately determined a task for the router-specific copy of the message. A decision policy may then be implemented to determine which router-specific copy of the message may be sent to another controller for task completion and/or generation of an appropriate response to be sent to the user.

Task Processing Controller

Task performance controller 106 of the system 100 shown in FIG. 1 is communicatively coupled to the processing and routing controller 104 and, in turn, may be further coupled to dispatch controller 102. In some inventive aspects, task performance controller 106 includes different modules of skills/actions. In some instances, the modules of skills/actions that are included in task processing controller 106 depend on what a user can do via a particular bot. For instance, if a user communicates via a bot of a specific type with a functionality that is independent of the organization, then in some such cases, the incoming message may be directly routed from the message attribute processing controller and/or dispatch controller 102 to task processing controller 106. For example, if a user is communicating with a FAQ bot that has only FAQ interaction functionality, the augmented message router will not return a response if the communication is about invoking a workflow since the FAQ bot does not support this functionality. In other instances, if the bot has a functionality that is scoped at the organization level (e.g., Company X's FAQ bot no longer responds to questions due to a trial period ending), in such instances the skills/actions may be handled either at the augmented message router or at task processing controller 106 depending on the nature of the functionality scoping.

In some inventive aspects, routed message is sent from processing and routing controller 104 to task performance controller 106 via an internal message bus. Data, such as function returned message may also be sent from task performance controller 106 to at least one of processing and routing controller 104 and dispatch controller 102 via at least one internal message bus. Task performance controller 106 may be configured to obtain processed and routed messages from processing and routing controller 104 and execute one or more skills/actions requested therein. In some inventive aspects, task performance controller 106 can include two functionalities—1) implementing an appropriate module of skill/action based on the routed message 2) managing admin portal (e.g., admin portal 114 in FIG. 1) interaction. This function is illustrated using a non-limiting example. Say a user sends an open ticket request via a bot. The open ticket request may be processed by dispatch controller 102 and processing and routing controller 104. The open ticket request may then be routed to a specific module in task performance controller 106. The task performance controller 106 may post this ticket on the admin portal via a communications platform/provider so that an administrator in the organization can view this ticket.

In some inventive aspects, task performance controller 106 calls/invokes the appropriate module of skill/action based on the domain and/or task in the routed message. The appropriate module then executes the skill/action. In some inventive aspects, task performance controller 106 initiates an outgoing response based on the incoming message. In some inventive aspects, task performance controller invokes a specific skill based on the incoming message. Upon execution of the skill, task performance controller 106 may return function returned message to processing and routing controller 104 to prepare a response via natural language generation or may return a function returned message directly to dispatch controller 102 to format the outgoing response in the schema of the outgoing communications platform/provider.

In some inventive aspects, one or more modules of skills/actions may involve an external service and therefore the one or more skills/actions may integrate with a third party service (e.g., Confluence™, Zendesk™, Twitter™). For example, say a task determined by an augmented router controller includes posting a Tweet™, then a module in task performance controller 106 that integrates with Twitter™ may be called. Third party services may be integrated in task performance controller 106 in one of two ways. First, by creating a special market place application that may be bundled up in such a way that the functionality of system 100 may be embedded into the product of the third party services. Second, by creating an authentication token that may be passed as a parameter every time a third party API is called via REST. In some inventive aspects, task performance controller 106 may be configured to access functionalities of processing and routing controller 104 and dispatch controller 102 via internal APIs.

According to some inventive aspects, an example code for a base skill set (i.e., entry point for performing skills via domains/tasks) is included in the computer program listing appendix.

According to some inventive aspects, an example code for executing skills related to question answering is included in the computer program listing appendix.

Figure 9:
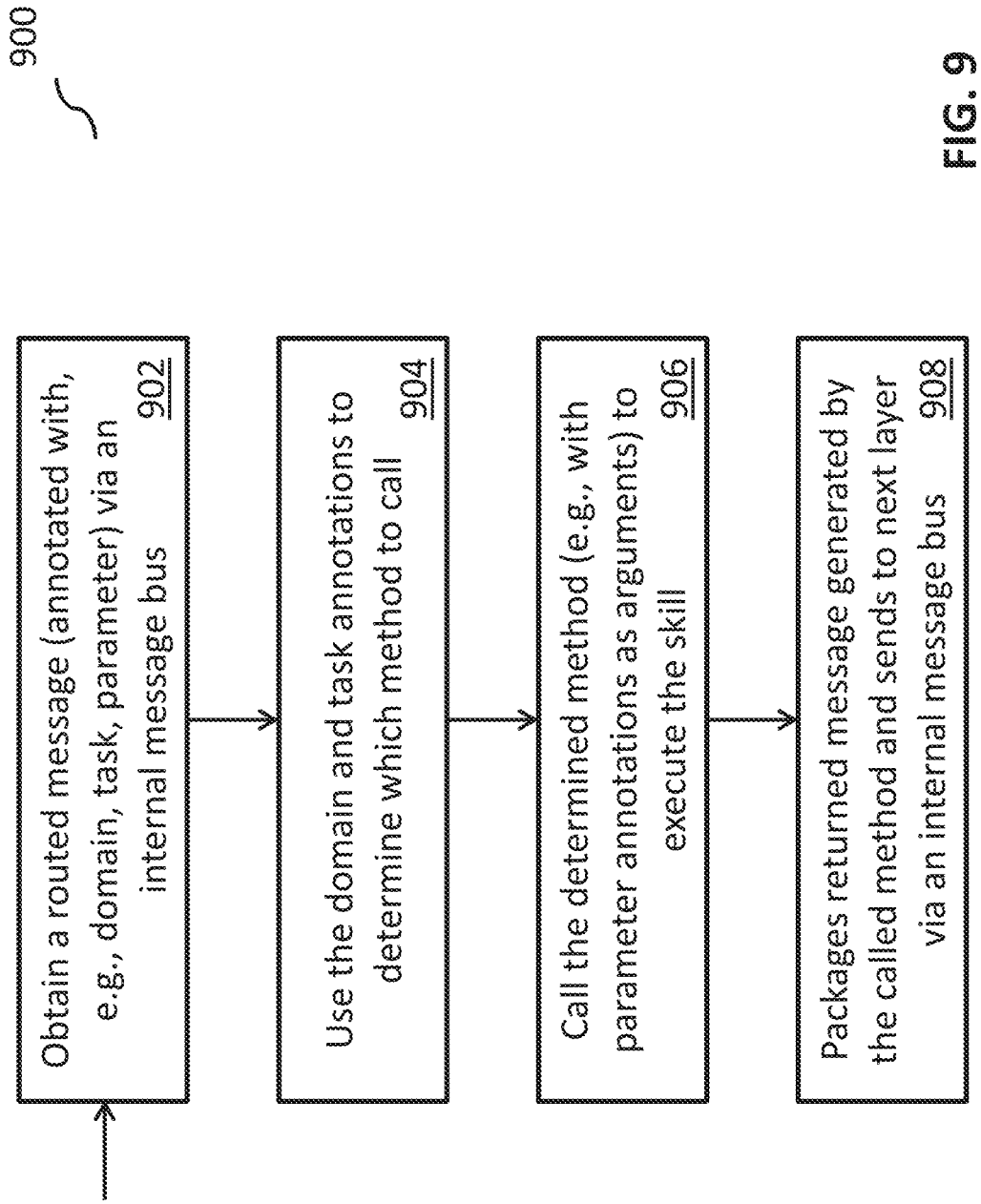
FIG. 9 is a flow diagram illustrating a method for task performance in accordance with some inventive aspects.

FIG. 9 is a flow diagram illustrating a method for task performance in accordance with some inventive aspects. In method 900, a message may be routed to appropriate module/component(s) within a task performance controller via an internal message bus. At 902, a task performance controller obtains the routed message from a processing and routing controller. In some inventive aspects, the routed message is associated/tagged with "domain," "task," "parameters," another indicator, and/or a combination thereof. For example, the incoming message "schedule a meeting with Bob and Sally" may be classified as a "schedule_meeting" command, which is then processed to extract users named "Bob & Sally" in the user's organization to serve as an "attendees" parameter in the meeting scheduling. At 904, task performance controller 106 may determine a method/function to be called based on the annotations/tags in order to execute the skill/action and/or initiate an outgoing message. At 906, the determined method/function may be called to execute the specific skill, return a value, initiate an outgoing response and/or a combination thereof. In some inventive aspects, the annotations/tags may be used as parameters for the method/function. At 908, the function returned message from the called function/method may be sent to the next controller via an internal bus.

Memory Device/Storage

One or more memory/storage devices 108 including for example, a database, may be communicatively coupled to dispatch controller 102, processing and routing controller 104, and/or task performance controller 106. In some inventive aspects, a memory device includes a cloud server such as Amazon Web Services™. A memory device may be in close physical proximity to or physically remote from system 100 or at least one component thereof. Information associated with messages and/or tasks may be stored in a memory device. Further, a memory device may be configured such that system 100 or at least one component thereof can readily access such information when necessary.

Dispatch Controller (Outgoing Message)

In some exemplary implementations, the outgoing response messages are returned via the same communications platform as the incoming user request communications platform. In some inventive aspects, dispatch controller 102 may be configured to reroute messages to the user via an additional or different communications platform based on various factors, such as availability, effectiveness, cost, predetermined user preferences, etc. For example, if the user requests a task via a communications platform such as Slack™, and Slack™ becomes unavailable, dispatch controller 102 may opt to re-route a return outgoing message to the same user via a different communications platform such as SMS.

Dispatch controller 102 may be further configured to reformat the function returned message according to the schema of the intended communications platform/provider. In some inventive aspects, dispatch controller 102 obtains the function returned message from the other components/ controllers of the system 100 in a standard format. In general, these messages need to be reformatted to be the schema of intended communications platform. For example, some communications platforms support HyperText Markup Language (HTML) text formatting, in which case function returned messages are converted from the standard format of the inventive aspect to an HTML format before being transmitted via the bot to these communications platforms/ providers. Some communications platforms use other formats such as Markdown, Extensible Markup Language (XML), Standard Generalized Markup Language (SGML), an audio compression format (e.g., MP3, AAC, Vorbis, FLAC, and Opus), a video file format (e.g., WebM, Flash Video, Vob, GIF, AVI, M4V, etc.), and others. Function returned messages are reformatted and/or converted accordingly.

Figure 10:
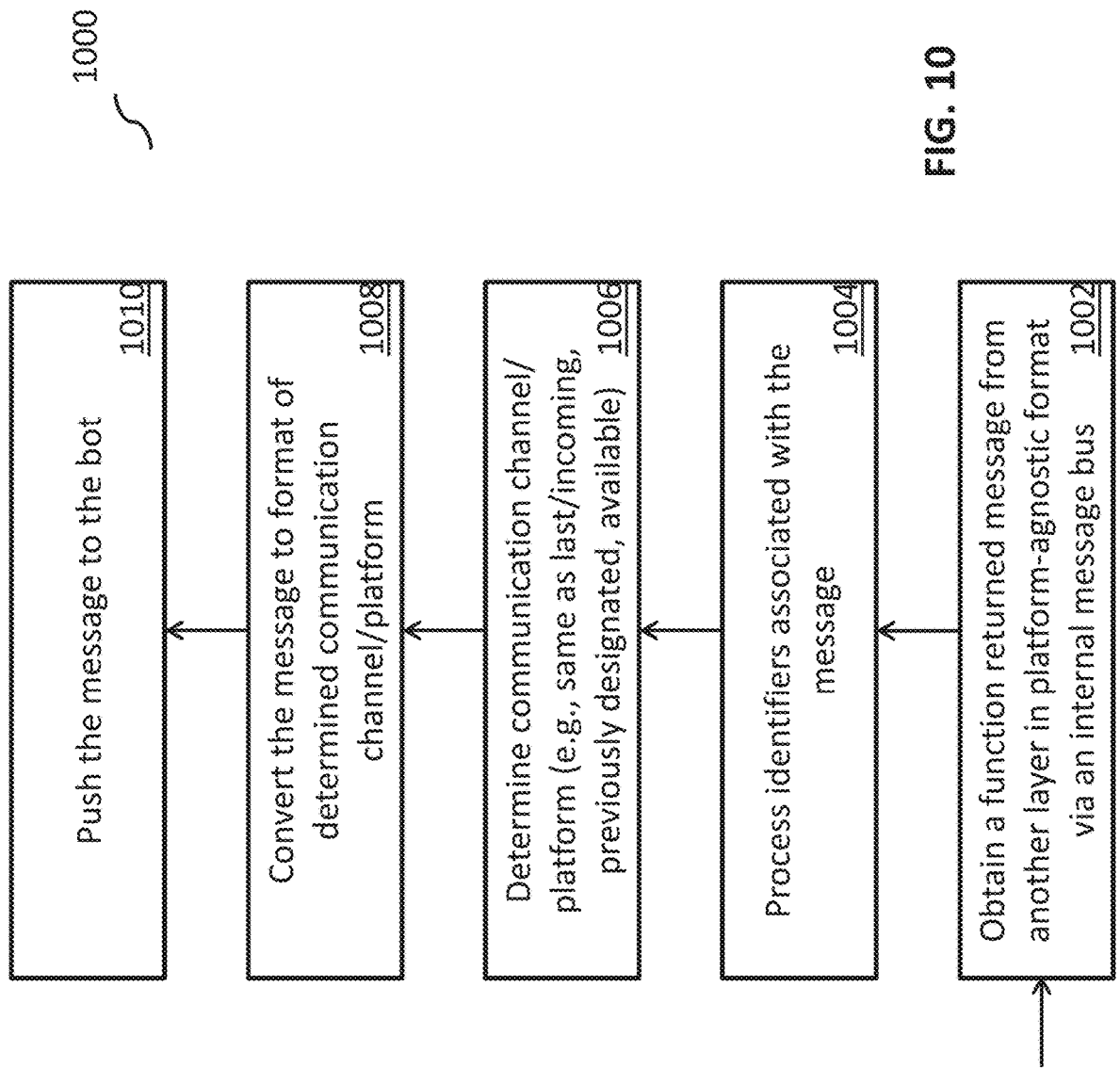
FIG. 10 is a flow diagram illustrating a method for dispatching an outgoing message in accordance with some inventive aspects.

FIG. 10 is a flow diagram illustrating a method for dispatching an outgoing schema message in accordance with some inventive aspects. At 1002, a first controller (e.g., dispatch controller) in a system may obtain a function returned message from a second controller (e.g., processing and routing controller and/or task performance controller) in the system. The function returned message obtained from the second controller via an internal message bus may be in a standard format (e.g., JSON). At 1004, the system may include at least one processor (e.g., processor 306 in FIG. 3) to process identifiers associated with the function returned message. Some examples of identifiers may include user-identity, communication platform/platform, type of response message, etc. At 1006, the system may determine the communication platform/provider for sending the outgoing message. In some inventive aspects, the communication platform for outgoing responses may be the same as the communication platform for incoming messages. In other inventive aspects, the incoming and outgoing communication platforms may vary. In some inventive aspects, if a communication platform for sending outgoing message does not respond, the system may dynamically determine a different communication platform for sending the same response. At 1008, one or more processors included in the first controller may convert the function returned message to a schema of the communication platform determined in the previous step.

Bot (Outgoing Message)

The outgoing schema message in the schema of the communication platform/provider is pushed to the bot. At the provider, the provider transforms the output schema message into natural language format. The outgoing message in natural language format is delivered to the user via the bot through the determined communication platform/ provider.

Admin Portal

In some inventive aspects, system 100 can include an admin portal (e.g., admin portal 114 in FIG. 1) that functions as an interface to one or more administrators within an organization (e.g., organization 124 in FIG. 1). The administrators can monitor and respond to incoming messages from user via admin portal 114. Some non-limiting functionalities of admin portal 114 include:
1) Enabling creation and definition of workflows.
2) Enabling administrators to review incoming messages from users. For example, an administrator (e.g., a service desk professional) may login to system 100 via admin portal 114 and review incoming requests (e.g., open tickets) from users.
3) Enabling administrators to search a memory/knowledgebase (e.g., memory 108 in FIG. 1) to determine a response to a user query. In some such instances, users may have read only access to the knowledgebase while the administrators may have access to modify content in the knowledgebase.

Example

The process of obtaining, processing, and executing an incoming message by system 100 is further illustrated with the following non-limiting example. A user types a message "Add task to 'complete documentation' due 4 P.M" into a bot via Slack™ on Sep. 15, 2016. Slack™ transforms the incoming message to a schema associated with Slack™. The transformed message/incoming schema massage is pushed to dispatch controller 102. Dispatch controller 102 receives the incoming schema message at a module that corresponds to Slack™. Dispatch controller 102 may then match the user to an internal profile of a known user of system 100. After the user is matched to an internal profile, dispatch controller 102 packages the message by annotating the message with identifiers associated with the message and/or user. The annotation may include the platform for obtaining the incoming message/message source [slack], user profile_id [12345], organization bot_id [123], and/or other initial basic information for interpreting the incoming message and routing a possible response. In some inventive aspects, the annotated message is packaged as a JSON string and the initial formatted message is sent to processing and routing controller 104 via an internal message bus such as Nanomsg™ (available from nanomsg.org).

Processing and routing controller 104 obtains the initial formatted message from dispatch controller 102. Processing and routing controller 104 may run the user's message through at least one message attribute processing controller. In this example, a "DateIntent" processing controller identifies "4 P.M." as a datetime value. The message attribute processing controller may remove the datetime value from the initial formatted message body, and annotate the message with the expression extracted_time_intents=[(2016, 09, 15, 16, 0)], which corresponds to 4 P.M. on the day the incoming message was sent. Processing and routing controller 104 may run a copy of the augmented message through at least one augmented message router. A particular augmented message router may or may not respond to a particular augmented message. However, if an augmented message router responds to a message, it may further extract and/or annotate a router-specific copy of the message including a domain and a task associated with the message (e.g., a user intent, any extracted parameters needed for that intent, and/or a probability score for how confident the router is in determining the user intent and subsequently executing the task/initiating an outgoing response). In this example, a regular expression message router (Regex Router) matches this message as it directly matches a pattern -/add task to "(.*)" due (.*)/ with domain="Tasks", task="create_task", parameters={title="complete documentation"}. Processing and routing controller 104 may implement a decision policy to select a routed task and send the fully annotated message/routed message associated with that routed task to task performance controller 106, via the internal message bus.

Task performance controller 106 obtains the routed message from processing and routing controller 104. Task performance controller 106 may use the domain and task annotations to determine the method that needs to be called to execute the task. In this example, the method Tasks::Processorcreate_task(message["parameters"]) is called. Task performance controller 106 sends the return message/function returned message generated by the called method to dispatch controller 102 via the internal message bus.

Dispatch controller 102 obtains the function returned message from task performance controller 106. Dispatch controller 102 takes the function returned message and may format it to a schema associated with the Slack™ application/system. Slack™ transforms the outgoing schema message to natural language format. The outgoing message may be sent via the Slack™ API to the user such that the user receives a response from system 100 via the bot (e.g., on a display).

Figure 11:
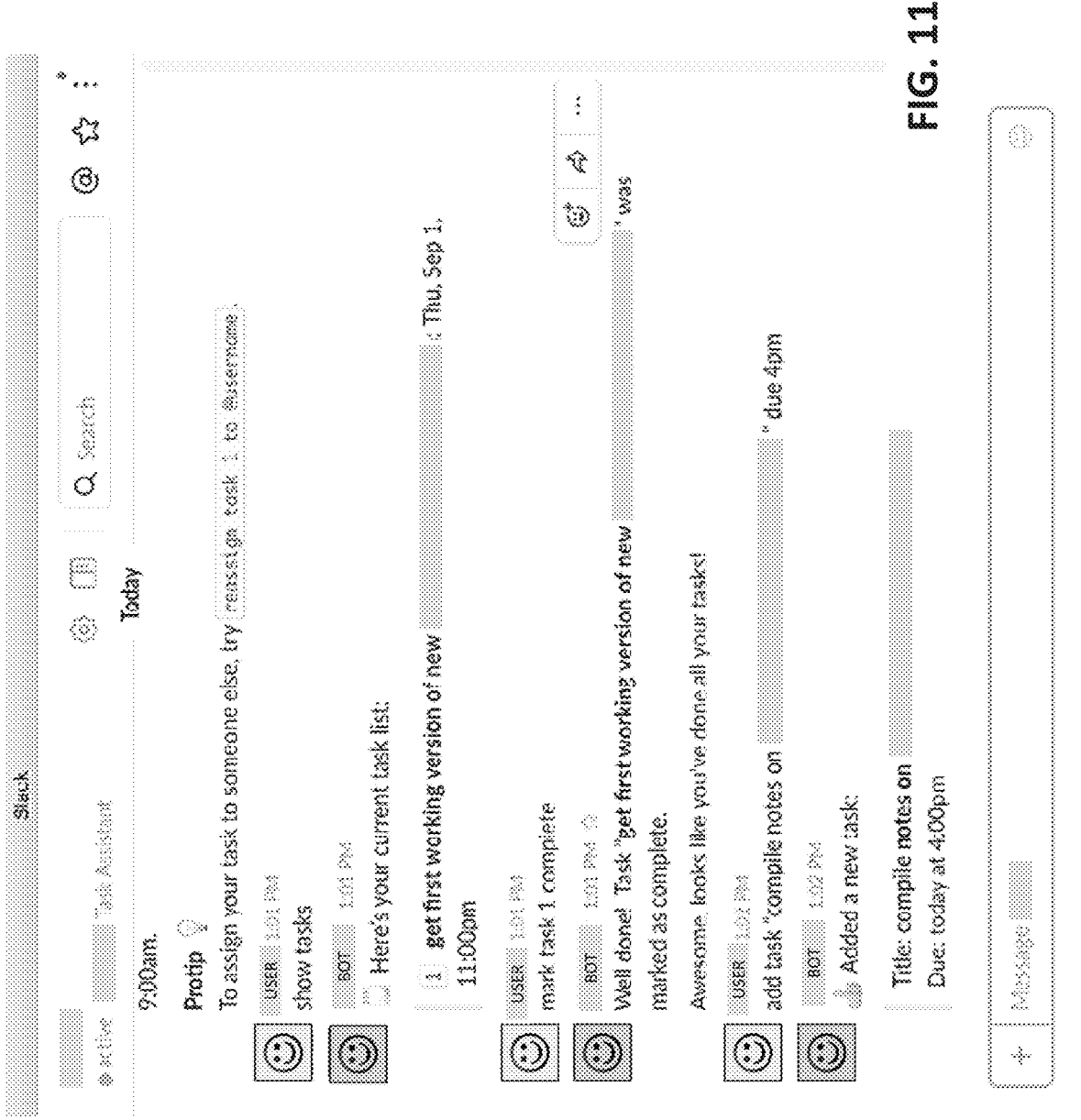
FIG. 11 is a screenshot of a display illustrating a user interface for making requests and receiving responses in accordance with some inventive aspects.

FIG. 11 is a screenshot of a display illustrating a user interface/bot interface for making requests and receiving response in accordance with some inventive aspects. In the example shown, a user sends requests to a chatbot designed according to some inventive aspects described herein.

In this example, a user communicates with the chatbot using the chat client Slack™ as a communications platform. For example, the user sends the first request, "show tasks," intending to review outstanding tasks associated with the user's account. The chatbot receives the first request via Slack™, resolves user-identity associated with the first request, formats the first request to a standard format, processes and modifies the first request by identifying specific features, determines user intent underlying the first request, routes the first request (e.g., based on machine learning techniques), performs a first task of collecting data regarding the outstanding tasks associated with the user, and/or generates a first response for the user. In some inventive aspects, the chatbot also determines a communications platform to deliver the first response to the user. In this example, the chatbot uses the same communications platform from which it obtained the first request to deliver the first response, that is, "Here's your current task list . . . ," with a display of the outstanding tasks associated with the user.

Next, the user sends a second request to "mark task 1 complete." The chatbot similarly processes this second request, performs a second task of modifying the data regarding the outstanding tasks associated with the user, and returns a second response, "Well done! . . . you've done all your tasks." The user further sends a third request to add a task to the list of the outstanding tasks. The chatbot similarly processes this third request, performs a third task of further modifying the data regarding the outstanding tasks associated with the user, and returns a third response with a confirmation of the added task, the title of the task, and the due date and time for the task.

CONCLUSION

While various inventive aspects have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive aspects described herein.

More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive aspects described herein. It is, therefore, to be understood that the foregoing inventive aspects are presented by way of example only and that, within the scope of the appended claims and equivalents thereto, inventive aspects may be practiced otherwise than as specifically described and claimed. Inventive aspects of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described inventive aspects can be implemented in any of numerous ways. For example, inventive aspects may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Also, various inventive concepts may be embodied as one or more methods, of which an example has been provided. The acts performed as part of the method may be ordered in any suitable way. Accordingly, inventive aspects may be constructed in which acts are performed in an order different than illustrated, which may include performing some acts simultaneously, even though shown as sequential acts in illustrative inventive aspects.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one inventive aspect, to A only (optionally including elements other than B); in another inventive aspect, to B only (optionally including elements other than A); in yet another inventive aspect, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one inventive aspect, to at least one, optionally including more than one, A, with no B present (and optionally including elements other than B); in another inventive aspect, to at least one, optionally including more than one, B, with no A present (and optionally including elements other than A); in yet another inventive aspect, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of responding to a first message from a user in an organization, the method comprising:
  instantiating at least one bot to perform a function, the at least one bot providing an interface to obtain the first message via a first communications channel within a first provider of a plurality of providers, the function aiding to user experience in obtaining a response;
  obtaining, at the at least one bot via the first communications channel, the first message in natural language format from the user;
  transforming, at the first provider, the first message to a second message format, the second message format being in a schema associated with the first provider and including data and metadata, at least a portion of the metadata including identification information associated with the first message;
  pushing the second message format to a first controller, the first controller including a first plurality of modules, each module in the first plurality of modules being associated with a corresponding provider in the plurality of providers;
  at the first controller:
    extracting, via a first module corresponding to the first provider in the first plurality of modules, the identification information from the second message format;
    associating the identification information with a plurality of identifiers;
    transforming the second message format to a third message format, the third message format being in a standard serialized format;
    determining a second provider in the plurality of providers to transmit the response to the user based on the third message format;
    transmitting the third message format to a second controller, the second controller including at least one processor, at least one router, and at least one machine learning model;
  at the second controller:
    transforming, via the at least one processor, the third message format to a fourth message format, wherein transforming to the fourth message format includes at least one of:
      mutating the third message format to at least one of remove and transform a specific identifier from the plurality of identifiers within the third message format; and
      adding contextual information to the third message format;
    transmitting the fourth message format to the at least one router;
    matching, via the at least one router, the fourth message format against at least one of a plurality of domains and a plurality of tasks, each domain in the plurality of domains including a collection of skills and each task in the plurality of tasks including a specific action;
    determining, via the at least one router, user intent in the first message based on the matching;
    returning, via the at least one router, a fifth message format based on the user intent, the fifth message format including a probability score indicating a likelihood that the user intent is accurate;
    implementing a decision policy to determine at least one of a domain from the plurality of domains and a task from the plurality of tasks based on the probability score;
    routing the fifth message format to a second module in a second plurality of modules included in a third controller based on the at least one of the domain and the task determined, each module in the second plurality of modules being configured to implement at least one of a skill and an action;
  at the third controller:
    implementing the second module to return a sixth message format, the sixth message format including the response to the first message,
    wherein implementing the second module includes at least one of calling a third party API and calling an internal API, the internal API being an access point to at least one functionality within at least one of the first controller and the second controller;
    transmitting the sixth message format to the first controller;
    transforming, via the first controller, the sixth message format to a seventh message format, the seventh message format being in a schema associated with the second provider in the plurality of providers;
    transforming, at the second provider, the seventh message format to the response in the natural language format; and
    transmitting, through the bot via a second communications channel within the second provider, the response in the natural language format to the user,
    wherein the at least one processor, the at least one router, the first controller, and the third controller are configured to access the at least one machine learning model included in the second controller via a web service endpoint.

2. The method of claim 1, wherein the function is specific to the organization and includes at least one of HR support, IT support, learning training and development, sales support, customer success support, market research support, general administrative support, facilities and operations support, credentialing and compliance management support, expert routing directory services, and general knowledge management and delivery.

3. The method of claim 1, further comprising:
  establishing a connection between the at least one bot and the first provider.

4. The method of claim 3, wherein the at least one bot includes a plurality of bots, and establishing the connection includes installing a bot application associated with the at least one bot into an environment associated with the first provider.

5. The method of claim 4, further comprising:
  assigning a user account to the at least one bot; and
  communicating, via the at least one bot with a plurality of users.

6. The method of claim 4, wherein establishing the connection further includes:

obtaining, via the at least one bot, at least one credential related to the first provider, the at least one credential including an authentication token granting permission to the at least one bot to access a workspace within the first provider; and initiating, via the at least one bot, the connection with the first provider based on the at least one credential.

7. The method of claim 3, wherein the at least one bot includes a plurality of bots, and establishing the connection includes setting up an interface to enable communication with the first controller, the second controller, and the third controller.

8. The method of claim 7, wherein establishing the connection further includes:

transmitting from the first provider an initial message to the at least one bot.

9. The method of claim 1, further comprising:

enabling, via a second interface, an administrator of the organization to at least one of monitor and respond to the first message from the user.

10. The method of claim 9, wherein the third controller is further configured to manage interaction with the administrator via the second interface.

11. The method of claim 9, wherein enabling the administrator to monitor and respond to messages includes configuring the second interface to:

enable the administrator and the user to create and define workflows;

enable the administrator to read incoming requests from the user; and enable the administrator to search a database to identify the response.

12. The method of claim 11, wherein the second interface is configured to provide access to the administrator to modify content in the database.

13. The method of claim 1, wherein the first message includes at least one of a query from the user, a poll response from the user in response to a poll initiated by the at least one bot, and a bot query response from the user in response to a query initiated by the at least one bot.

14. The method of claim 1, wherein associating the identification information further includes:

accessing a database to associate the identification information with the plurality of identifiers, the plurality of identifiers including a profile_id indicating a profile of the user, an organization_id indicating the organization, an account_uid indicating the user account as represented by the first provider, a provider_id indicating the first provider, a channel_id indicating the first communications channel, and a bot_id indicating the at least one bot.

15. The method of claim 14, wherein the database is configured to store a unique organization_id for each organization in a plurality of organizations and a unique profile_id for each user in a plurality of users within each organization in the plurality of organizations.

16. The method of claim 1, wherein the standard serialized format is a JSON format.

17. The method of claim 1, wherein the third message format includes:

a first portion including information indicating the user, the organization, the first provider, the first communications channel, and the at least one bot;

a second portion including information indicating the second provider; and a third portion including information indicating a body of the first message.

18. The method of claim 17, wherein the second portion further includes a plurality of keys that reference values corresponding to profile_id, organization_id, account_uid, provider_id, channel_id, and bot_id in a database.

19. The method of claim 17, wherein the third portion further includes a plurality of annotations of the first message including the contextual information.

20. The method of claim 1, wherein the second controller includes a third module and a fourth module, the third module including the at least one processor and the at least one router, and the fourth module including the at least one machine learning model.

21. The method of claim 20, wherein the fourth module exposes the at least one machine learning model via the web service endpoint.

22. The method of claim 21, wherein the web service endpoint is a HTTP endpoint.

23. The method of claim 21, wherein the first controller, the at least one processor, the at least one router, and the third controller accesses the at least one machine learning model via the fourth module.

24. The method of claim 1, wherein the at least one router includes a plurality of routers and the fourth message format is transmitted to each router in the plurality of routers in a plurality of different orders.

25. The method of claim 24, wherein each router in the plurality of routers returns the corresponding fifth message format based on the user intent determined by that router, the corresponding fifth message format including the corresponding probability score.

26. The method of claim 25, wherein implementing the decision policy includes:

making a comparison of the corresponding probability score from each router in the plurality of routers; and determining the at least one of the domain and the task based on the comparison.

27. A system, comprising:

a first interface to:

obtain a first message from a user via a first communications channel within a first provider in a plurality of providers; and deliver a response to the first message to the user via a second communications channel within a second provider in the plurality of providers;

a first controller communicatively coupled to the first interface, the first controller including a first plurality of modules, each module in the first plurality of modules corresponding to each provider in the plurality of providers, the first controller to:

associate the first message with a plurality of identifiers;

transform the first message to a standard serialized format;

identify the second communications channel to deliver the response; and transform the response in the standard serialized format to a schema associated with the second provider;

a second controller communicatively coupled to the first controller, the second controller including a dispatcher module and a server module, the dispatcher module including a plurality of processors and a plurality of routers, and the server module including a plurality of machine learning models, the second controller to:

determine a user intent in the first message;

determine at least one of a domain from a plurality of domains and a task from a plurality of tasks based on the user intent; and route the transformed first message based on at least one of the domain and the task; and a third controller communicatively coupled to the first controller and the second controller, the third controller including a second plurality of modules, each module in the second plurality of modules implementing a skill based on at least one domain in the plurality of domains or an action based on at least one task in the plurality of tasks, the third controller to:

implement a module in the second plurality of modules; and return the response in the standard serialized format to the first controller, the first controller, the third controller, the plurality of processors, and the plurality of routers being configured to access the plurality of machine learning models via at least one web service endpoint.

28. The system of claim 27, wherein the plurality of machine learning models include at least one of a maximum entropy classification, a Naive Bayes classification, a k-Nearest Neighbors (k-NN) clustering, a Word2vec analysis, a dependency tree analysis, an n-gram analysis, a hidden Markov analysis, and a probabilistic context-free grammar.

* * * * *